(12) United States Patent
Tripathi et al.

(10) Patent No.: US 9,302,594 B2
(45) Date of Patent: Apr. 5, 2016

(54) SELECTIVE COMMUNICATION BASED ON DISTANCE FROM A PLURALITY OF ELECTRIC VEHICLE WIRELESS CHARGING STATIONS IN A FACILITY

(71) Applicant: QUALCOMM Incorporated, San Diego, CA (US)

(72) Inventors: Manish Tripathi, San Diego, CA (US); Naidu S. Mullaguru, San Diego, CA (US); Rao S. Yenamandra, San Diego, CA (US); Rajasekar Arulprakasam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 13/946,875

(22) Filed: Jul. 19, 2013

(65) Prior Publication Data
US 2014/0035526 A1 Feb. 6, 2014

Related U.S. Application Data

(60) Provisional application No. 61/677,967, filed on Jul. 31, 2012, provisional application No. 61/696,012, filed on Aug. 31, 2012.

(51) Int. Cl.
*B60L 11/00* (2006.01)
*B60L 11/18* (2006.01)

(52) U.S. Cl.
CPC ........... *B60L 11/1838* (2013.01); *B60L 11/182* (2013.01); *B60L 11/1825* (2013.01); *B60L 11/1829* (2013.01); *B60L 11/1833* (2013.01); *B60L 11/1846* (2013.01); *B60L 11/1848* (2013.01); *B60L 2230/16* (2013.01); *B60L 2230/40* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/16* (2013.01); *Y02T 90/163* (2013.01); *Y02T 90/168* (2013.01);
(Continued)

(58) Field of Classification Search
None
See application file for complete search history.

(56) References Cited

U.S. PATENT DOCUMENTS 5,790,976 A 8/1998 Boll et al.
7,849,944 B2 12/2010 DeVault (Continued)

FOREIGN PATENT DOCUMENTS

DE 102009028968 A1 3/2011
DE 10 2012 012 860 A1 * 6/2012 ............. G08C 17/02

(Continued)

OTHER PUBLICATIONS

International Search Report and Written Opinion—PCT/US2013t051509—ISA/EPO—Dec. 5, 2013.

(Continued)

*Primary Examiner* — Leigh Garbowski
(74) *Attorney, Agent, or Firm* — Knobbe, Martens, Olson & Bear LLP

(57) ABSTRACT

Systems, methods, and apparatus are disclosed for charging a vehicle in a wireless power transfer system. In one aspect, a method of charging a vehicle is provided, including determining distances between the vehicle and each of a plurality of charging stations. The method further includes selectively communicating, based on the distances, with a first charging station of the plurality of charging stations.

36 Claims, 15 Drawing Sheets

(52) U.S. Cl.
CPC ............... *Y02T 90/169* (2013.01); *Y04S 30/12* (2013.01); *Y04S 30/14* (2013.01)

(56) References Cited

U.S. PATENT DOCUMENTS

| | | |
|---|---|---|
| 8,294,420 B2 | 10/2012 | Kocher |
| 8,368,349 B2 * | 2/2013 | Zyren .......................... 320/109 |
| 8,548,659 B2 * | 10/2013 | Tanaka ............................ 701/22 |
| 8,606,445 B2 * | 12/2013 | Yaguchi et al. ................. 701/22 |
| 8,884,581 B2 * | 11/2014 | Widmer et al. ............... 320/108 |
| 8,975,864 B2 * | 3/2015 | Kim ............................... 320/109 |
| 9,184,830 B2 * | 11/2015 | Heuer ...................... H04B 7/24 |
| 2008/0039980 A1 * | 2/2008 | Pollack et al. ................. 700/295 |
| 2009/0043520 A1 * | 2/2009 | Pollack et al. .................. 702/62 |
| 2010/0161216 A1 * | 6/2010 | Yamamoto .................... 701/207 |
| 2010/0274697 A1 * | 10/2010 | Zyren ............................. 705/34 |
| 2011/0082612 A1 * | 4/2011 | Ichikawa ........................ 701/22 |
| 2011/0193522 A1 | 8/2011 | Uesugi |
| 2011/0199028 A1 * | 8/2011 | Yamazaki et al. ............. 318/139 |
| 2011/0224900 A1 * | 9/2011 | Hiruta et al. .................. 701/201 |
| 2011/0254503 A1 * | 10/2011 | Widmer et al. ............... 320/108 |
| 2012/0109519 A1 * | 5/2012 | Uyeki ............................ 701/439 |
| 2012/0136574 A1 * | 5/2012 | Kobayashi et al. ........... 701/533 |
| 2012/0158227 A1 * | 6/2012 | Tate et al. ....................... 701/22 |
| 2012/0191242 A1 * | 7/2012 | Outwater et al. ............. 700/236 |
| 2012/0271723 A1 * | 10/2012 | Penilla et al. ................... 705/16 |
| 2013/0038272 A1 * | 2/2013 | Sagata .......................... 320/106 |
| 2013/0046457 A1 * | 2/2013 | Pettersson .................... 701/117 |
| 2013/0110296 A1 * | 5/2013 | Khoo et al. ................... 700/286 |
| 2013/0127416 A1 * | 5/2013 | Karner et al. ................. 320/109 |
| 2013/0179061 A1 * | 7/2013 | Gadh et al. .................... 701/123 |
| 2013/0193918 A1 * | 8/2013 | Sarkar et al. ................. 320/109 |
| 2013/0222158 A1 * | 8/2013 | Dai et al. .................. 340/995.13 |
| 2013/0282472 A1 * | 10/2013 | Penilla et al. .............. 705/14.35 |
| 2013/0339072 A1 * | 12/2013 | Touge ................................ 705/5 |
| 2014/0028254 A1 * | 1/2014 | Shane et al. .................. 320/109 |
| 2014/0203077 A1 * | 7/2014 | Gadh et al. .................... 235/382 |
| 2014/0292270 A1 * | 10/2014 | Ichikawa ....................... 320/108 |
| 2014/0347018 A1 * | 11/2014 | Boblett et al. ................ 320/162 |
| 2015/0015193 A1 * | 1/2015 | Oman et al. .................. 320/108 |

FOREIGN PATENT DOCUMENTS

| | | |
|---|---|---|
| EP | 2199142 A1 | 6/2010 |
| EP | 2199143 A1 | 6/2010 |
| WO | 2012058022 A2 | 5/2012 |
| WO | WO-2012090703 A1 | 7/2012 |
| WO | 2013057587 A2 | 4/2013 |

OTHER PUBLICATIONS

Written Opinion (Rule 66)—PCT/US2013/051509—IPEA/EPO—Oct. 13, 2014.

* cited by examiner

SELECTIVE COMMUNICATION BASED ON DISTANCE FROM A PLURALITY OF ELECTRIC VEHICLE WIRELESS CHARGING STATIONS IN A FACILITY

RELATED APPLICATIONS

This application claims the benefit of priority of U.S. Provisional Appl. No. 61/677,967, entitled "SYSTEMS, METHODS, AND APPARATUS RELATED TO ELECTRIC VEHICLE WIRELESS CHARGING AND PARKING," filed Jul. 31, 2012, the entirety of which is incorporated herein by reference, and U.S. Provisional Appl. No. 61/696,012, entitled "SYSTEMS, METHODS, AND APPARATUS RELATED TO ELECTRIC VEHICLE WIRELESS CHARGING," filed Aug. 31, 2012, the entirety of which is incorporated herein by reference.

FIELD

The present disclosure relates generally to wireless power transfer, and more specifically to systems, methods, and apparatus related to wireless power transfer to remote systems such as electric vehicles in a parking facility and effective identification of a desired charging station in the parking facility.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions.

In a parking facility with a plurality of charging stations available, a capable vehicle must navigate within the parking facility to find a proper parking space for receiving charging from a charging station therein. A vehicle may attempt to pair with every charging station within its communication range when a driver is attempting to use a wireless power charging facility with multiple charging pads. As such, wireless charging systems and methods that efficiently and effectively facilitate the identification of a charging station for a vehicle are needed.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides a method of charging a vehicle. The method includes determining distances between the vehicle and each charging station of a plurality of charging stations. The method further includes selectively communicating, based on the distances, with a first charging station of the plurality of charging stations.

Another aspect of the subject matter described in this disclosure provides an apparatus for charging a vehicle. The apparatus includes a processor configured to determine distances between the vehicle and each charging station of a plurality of charging stations. The apparatus further includes a transceiver configured to selectively communicate, based on the distances, with a first charging station of the plurality of charging stations.

Yet another aspect of the subject matter described in this disclosure provides an apparatus for charging a vehicle. The apparatus includes means for determining distances between the vehicle and each charging station of a plurality of charging stations. The apparatus further includes means for selectively communicating, based on the distances, with a first charging station of the plurality of charging stations.

Another aspect of the subject matter described in this disclosure provides a non-transitory computer-readable medium comprising code that, when executed by one or more processors, causes an apparatus to determine distances between a vehicle and each charging station of a plurality of charging stations; and to selectively communicate, based on the distances, with a first charging station of the plurality of charging stations.

Figure 1:
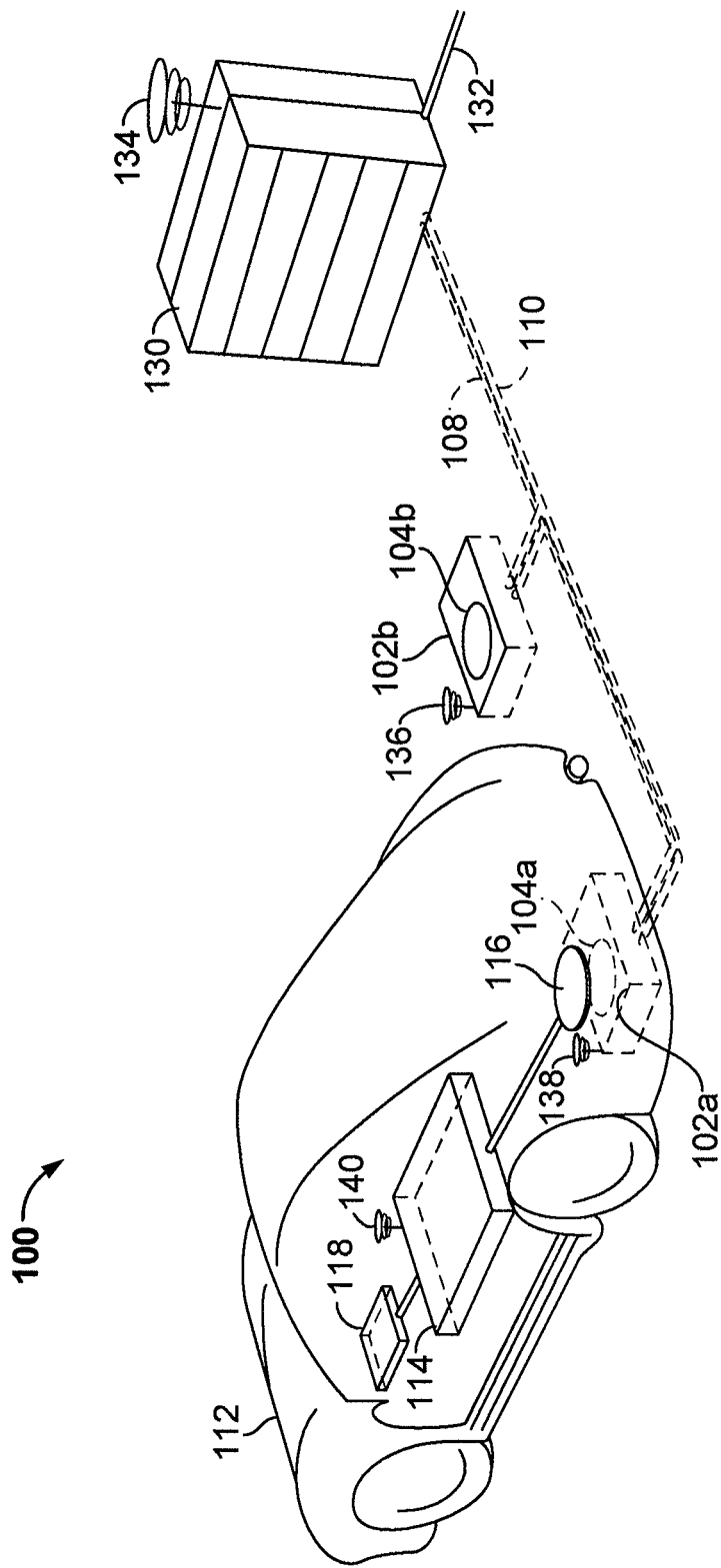
FIG. 1 illustrates a diagram of an exemplary wireless power transfer system for charging an electric vehicle, in accordance with an exemplary embodiment of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include electric motors in addition to a traditional combustion engine for direct locomotion or for charging the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of an exemplary wireless power transfer system 100 for charging an electric vehicle 112, in accordance with an exemplary embodiment of the invention. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power and an antenna 136. An electric vehicle 112 may include a battery unit 118, an electric vehicle induction coil 116, an electric vehicle wireless charging system 114, and an antenna 140. The electric vehicle induction coil 116 may interact with the base system induction coil 104a, for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112 (e.g., to charge the battery unit 118). In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about $1/2\pi$ of wavelength of the base system induction coil 104a (and vice versa for the electric vehicle induction coil 116) as will be further described below.

Local distribution center 130 may be configured to communicate with external sources (e.g., a power grid) via a communication backhaul 134, and with the base wireless charging system 102a via a communication link 108.

Base wireless charging systems 102a and 102b may be configured to communicate with the electric vehicle wireless charging system 114 via antennas 136 and 138. For example, the wireless charging system 102a may communicate with the electric vehicle wireless charging system 114 using a communication channel between antennas 138 and 140. The communication channels may be any type of communication channels such as, for example, Bluetooth, zigbee, cellular, wireless local area network (WLAN), etc.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
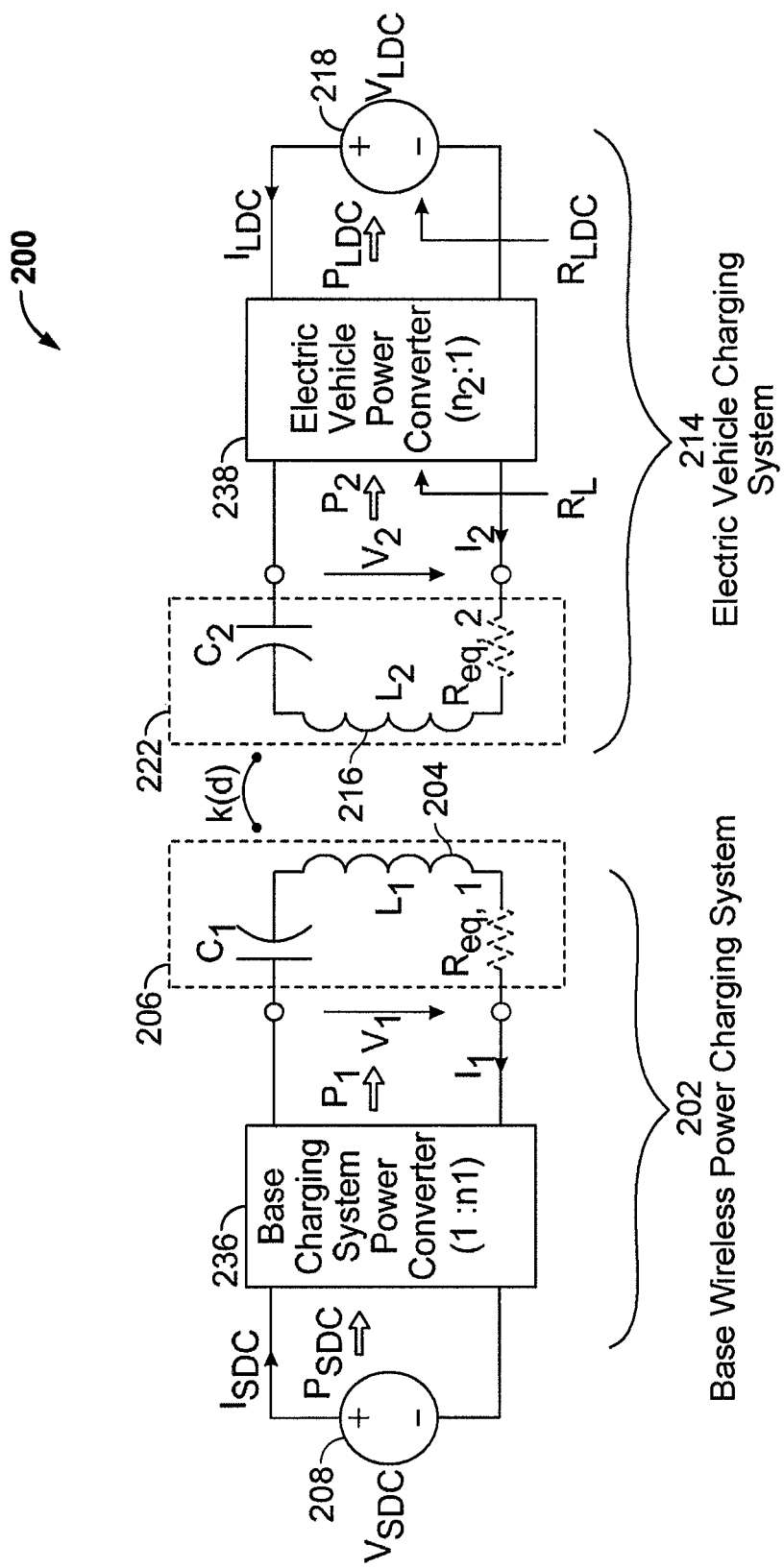
FIG. 2 illustrates a schematic diagram of exemplary core components of the wireless power transfer system of FIG. 1.

FIG. 2 is a schematic diagram of exemplary components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit an electromagnetic field at a desired frequency. The capacitor $C_1$ may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor $C_2$ and electric vehicle induction coil 116. The capacitor $C_2$ may be provided to form a resonant circuit with the electric vehicle induction coil 216 that resonates at a desired frequency. Element k(d) represents the mutual coupling coefficient resulting at coil separation. Equivalent resistances $R_{eq,1}$ and $R_{eq,2}$ represent the losses that may be inherent to the induction coils 204 and 216 and the anti-reactance capacitors $C_1$ and $C_2$. The electric vehicle receive circuit 222 including the electric vehicle induction coil 316 and capacitor $C_2$ receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 116 are configured according to a mutual resonant relationship such that the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coils" is intended to refer to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non-limiting example, as shown in FIG. 2, a capacitor may be added in series with the induction coil to create a resonant circuit (e.g., the base system transmit circuit 206) that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil. For example, the Q factor may be 300 or greater.

As described above, according to some embodiments, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
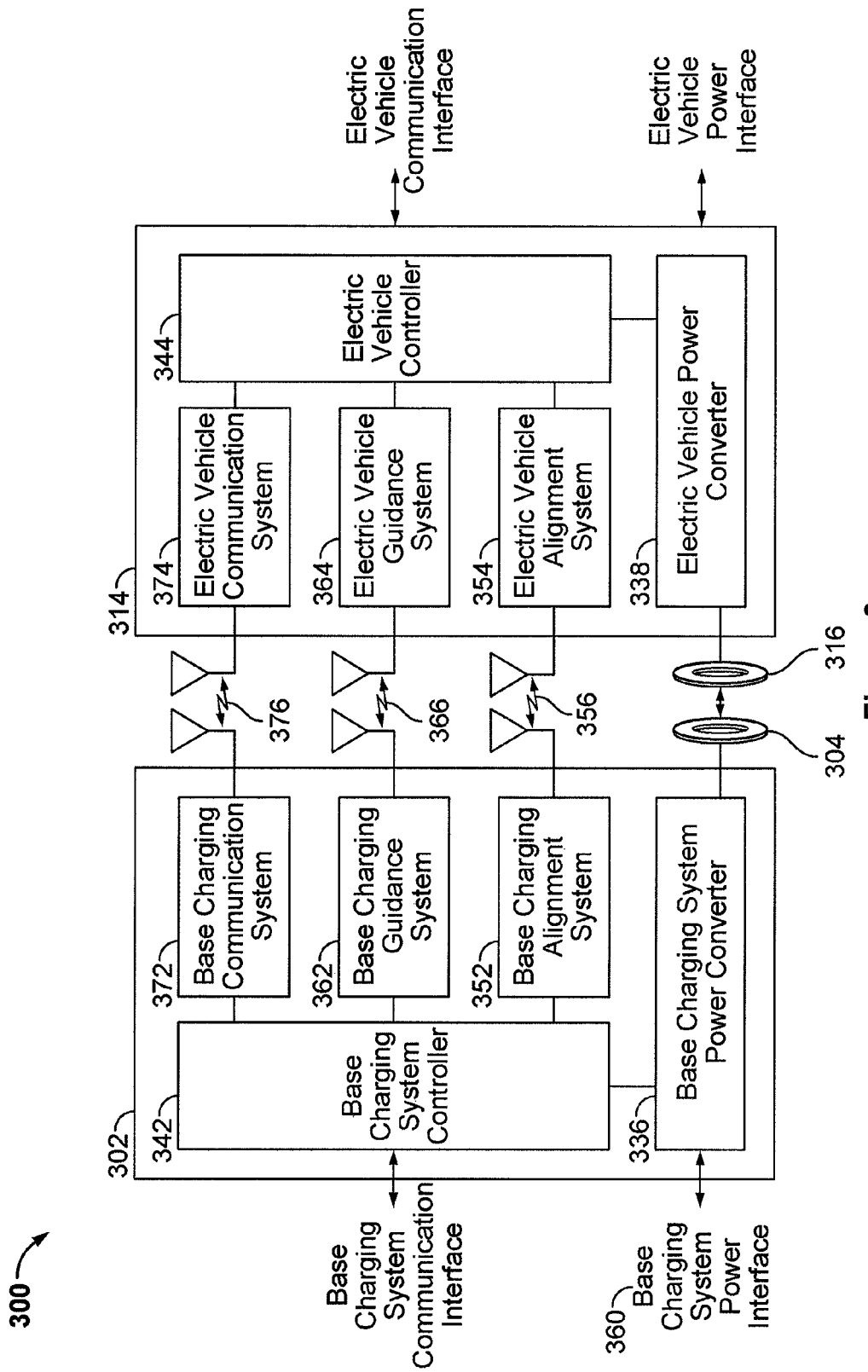
FIG. 3 illustrates another functional block diagram showing exemplary core and ancillary components of the wireless power transfer system of FIG. 1.

FIG. 3 is another functional block diagram showing exemplary core and ancillary components of the wireless power transfer system 100 of FIG. 1. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 360 may be configured to provide power to a charging system power converter 336 from a power source, such as an AC or DC power supply 126. The base charging system power converter 336 may receive AC or DC power from the base charging system power interface 360 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 may include a base charging system communication interface to other systems (not shown) such as, for example, a computer, a wireless device, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 356 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link 366 to provide a feedback mechanism to guide an operator in aligning the base system induction coil 304 and electric vehicle induction coil 316. In addition, there may be separate general-purpose communication links (e.g., channels), such as communication link 376, supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, as well as maintenance and diagnostic data for the electric vehicle 112. These communication links or channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of metal objects near the base system induction coil 304 that may be heated up (induction heating), detection of hazardous events such as incandescent objects on the base system induction coil 304, and temperature monitoring of the base wireless power charging system 302 and electric vehicle charging system 314 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-added services to the vehicle user/owner. A low depth amplitude or phase modulation of the wireless power carrier may serve as an in-band signaling system with minimal interference.

The base charging system power converter 336 may further include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some embodiments may be configured to transfer power at a frequency in the range from 10-60 kHz. This low frequency coupling may allow highly efficient power conversion that may be achieved using solid state devices. In addition, there may be less coexistence issues with radio systems compared to other bands.

Figure 4A:
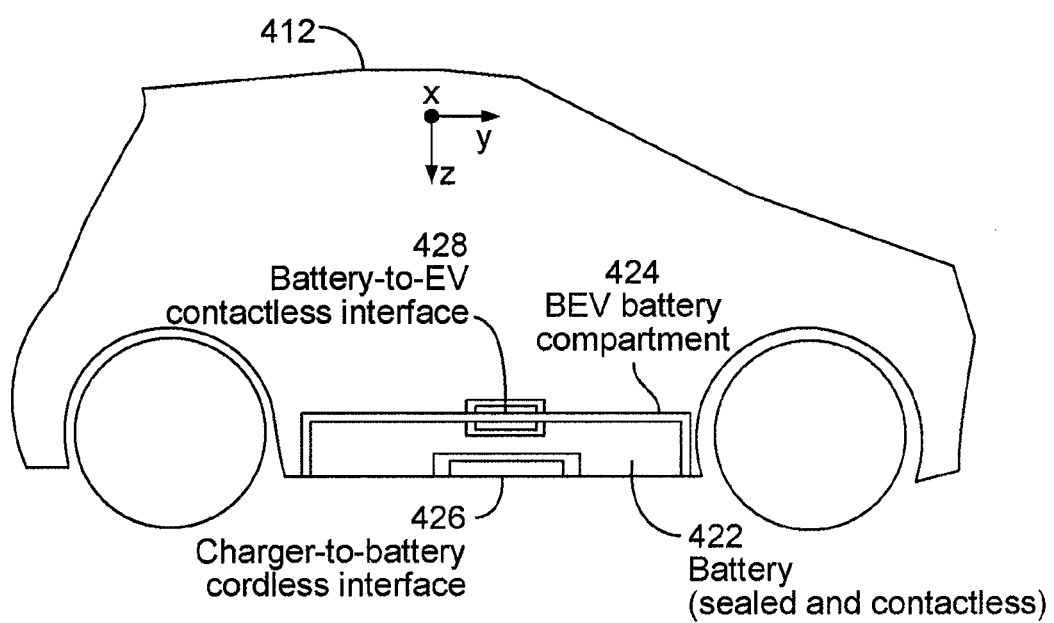
FIG. 4A illustrates a functional block diagram showing a replaceable contactless battery disposed in an electric vehicle, in accordance with an exemplary embodiment.

The wireless power transfer system 100 described may be used with a variety of electric vehicles 102 including rechargeable or replaceable batteries. FIG. 4A is a functional block diagram showing a replaceable contactless battery disposed in an electric vehicle 412, in accordance with an exemplary embodiment of the invention. In this embodiment, the low battery position may be useful for an electric vehicle battery unit that integrates a wireless power interface (e.g., a charger-to-battery cordless interface 426) and that may receive power from a charger (not shown) embedded in the ground. In FIG. 4A, the electric vehicle battery unit may be a rechargeable battery unit, and may be accommodated in a battery compartment 424. The electric vehicle battery unit also provides a wireless power interface 426, which may integrate the entire electric vehicle wireless power subsystem including a resonant induction coil, power conversion circuitry, and other control and communications functions as needed for efficient and safe wireless energy transfer between a ground-based wireless charging unit and the electric vehicle battery unit.

As discussed above, the electric vehicle charging system 114 may be placed on the underside of the electric vehicle 112 for transmitting and receiving power from a base wireless charging system 102a. For example, an electric vehicle induction coil 116 may be integrated into the vehicles underbody preferably near a center position providing maximum safety distance in regards to EM exposure and permitting forward and reverse parking of the electric vehicle.

Figure 4B:
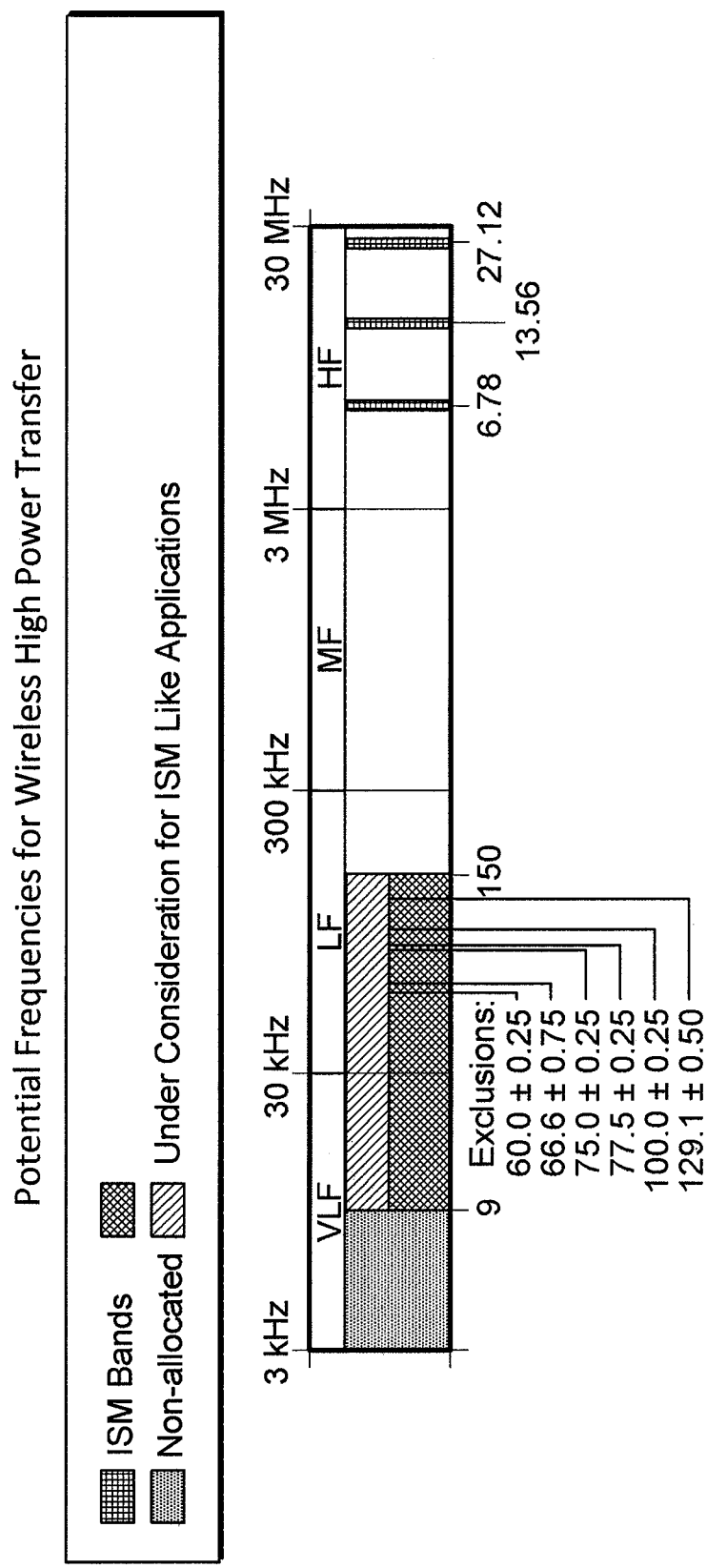
FIG. 4B is a chart of a frequency spectrum showing exemplary frequencies that may be used for wireless charging an electric vehicle, in accordance with an exemplary embodiment of the invention.

FIG. 4B is a chart of a frequency spectrum showing exemplary frequencies that may be used for wireless charging an electric vehicle, in accordance with an exemplary embodiment of the invention. As shown in FIG. 4B, potential frequency ranges for wireless high power transfer to electric vehicles may include: VLF in a 3 kHz to 30 kHz band, lower LF in a 30 kHz to 150 kHz band (for ISM-like applications) with some exclusions, HF 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

Figure 4C:
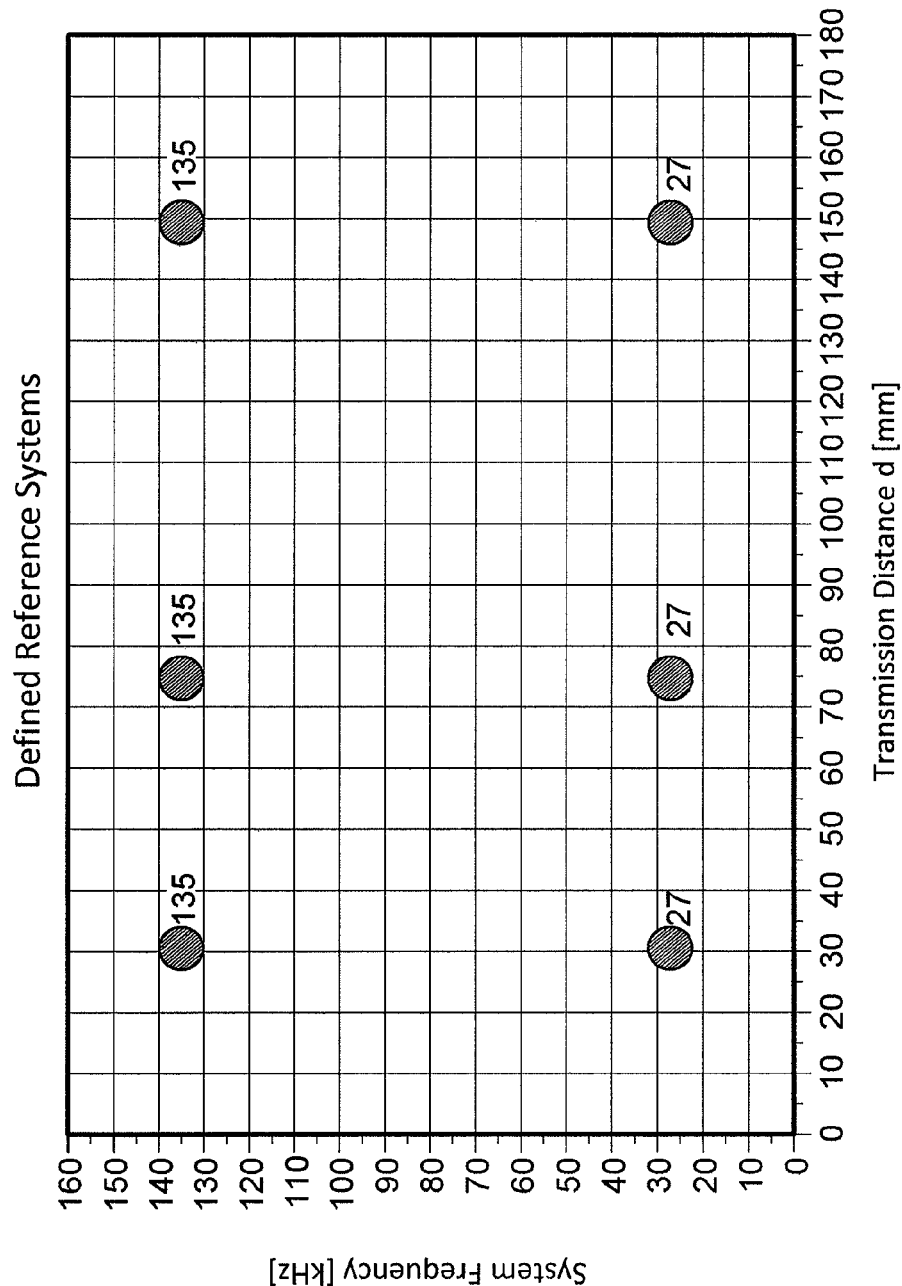
FIG. 4C is a chart showing exemplary frequencies and transmission distances that may be useful in wireless charging electric vehicles, in accordance with an exemplary embodiment of the invention.

FIG. 4C is a chart showing exemplary frequencies and transmission distances that may be useful in wireless charging electric vehicles, in accordance with an exemplary embodiment of the invention. Some example transmission distances that may be useful for electric vehicle wireless charging are about 30 mm, about 75 mm, and about 150 mm. Some exemplary frequencies may be about 27 kHz in the VLF band and about 135 kHz in the LF band.

During a charging cycle of an electric vehicle, a Base Charging Unit (BCU) of the wireless power transfer system may go through various states of operation. The wireless power transfer system may be referred to as a "charging system." The BCU may include the base wireless charging system 102a and/or 102b of FIG. 1. The BCU may also include a controller and/or a power conversion unit, such as power converter 236 as illustrated in FIG. 2. Further, the BCU may include one or more base charging pads that include an induction coil, such as induction coils 104a and 104b as illustrated in FIG. 1. As the BCU goes through the various states, the BCU interacts with a charging station. The charging station may include the local distribution center 130, as illustrated in FIG. 1, and may further include a controller, a graphical user interface, a communications module, and a network connection to a remote server or group of servers.

It may be useful for the electric vehicle induction coil to be integrated flush with a bottom side of electric vehicle battery unit or the vehicle body so that there are no protrusive parts and so that the specified ground-to-vehicle body clearance may be maintained. This configuration may require some room in the electric vehicle battery unit dedicated to the electric vehicle wireless power subsystem. The electric vehicle battery unit 422 may also include a battery-to-EV cordless interface 422, and a charger-to-battery cordless interface 426 that provides contactless power and communication between the electric vehicle 412 and a base wireless charging system 102a as shown in FIG. 1.

In some embodiments, and with reference to FIG. 1, the base system induction coil 104a and the electric vehicle induction coil 116 may be in a fixed position and the induction coils are brought within a near-field coupling region by overall placement of the electric vehicle induction coil 116 relative to the base wireless charging system 102a. However, in order to perform energy transfer rapidly, efficiently, and safely, the distance between the base system induction coil 104a and the electric vehicle induction coil 116 may need to be reduced to improve coupling. Thus, in some embodiments, the base system induction coil 104a and/or the electric vehicle induction coil 116 may be deployable and/or moveable to bring them into better alignment.

As discussed above, the electric vehicle charging system 114 may be placed on the underside of the electric vehicle 112 for transmitting and receiving power from a base wireless charging system 102a. For example, an electric vehicle induction coil 116 may be integrated into the vehicles underbody preferably near a center position providing maximum safety distance in regards to EM exposure and permitting forward and reverse parking of the electric vehicle.

With reference to FIG. 1, the charging systems described above may be used in a variety of locations for charging an electric vehicle 112, or transferring power back to a power grid. For example, the transfer of power may occur in a parking lot environment or in another parking area. It is noted that a "parking area" may comprise one or more "parking spaces" each configured to contain one electric vehicle at a time. To enhance the efficiency of a vehicle wireless power transfer system 100, an electric vehicle 112 may be aligned (e.g., using a sense current) along an X direction and a Y direction to enable an electric vehicle induction coil 116 within the electric vehicle 112 to be adequately aligned with a base wireless charging system 102a within an associated parking space.

Furthermore, the disclosed embodiments are applicable to parking areas (e.g., parking lots) having one or more parking spaces, wherein at least one parking space within a parking area may comprise a base wireless charging system 102a. For example, a common parking area can contain a plurality of charging stations, each in a corresponding parking space of the common parking area. Guidance systems (not shown) may be used to assist a vehicle operator in positioning an electric vehicle 112 in a parking space of the parking area to align an electric vehicle induction coil 116 within the electric vehicle 112 with a base wireless charging system 102a. Guidance systems may include electronic based approaches (e.g., radio positioning, direction finding principles, and/or optical, quasi-optical and/or ultrasonic sensing methods) or mechanical-based approaches (e.g., vehicle wheel guides, tracks or stops), or any combination thereof, for assisting an electric vehicle operator in positioning an electric vehicle 112 to enable an induction coil 116 within the electric vehicle 112 to be adequately aligned with a charging induction coil within a charging base (e.g., base wireless charging system 102a).

Figure 5:
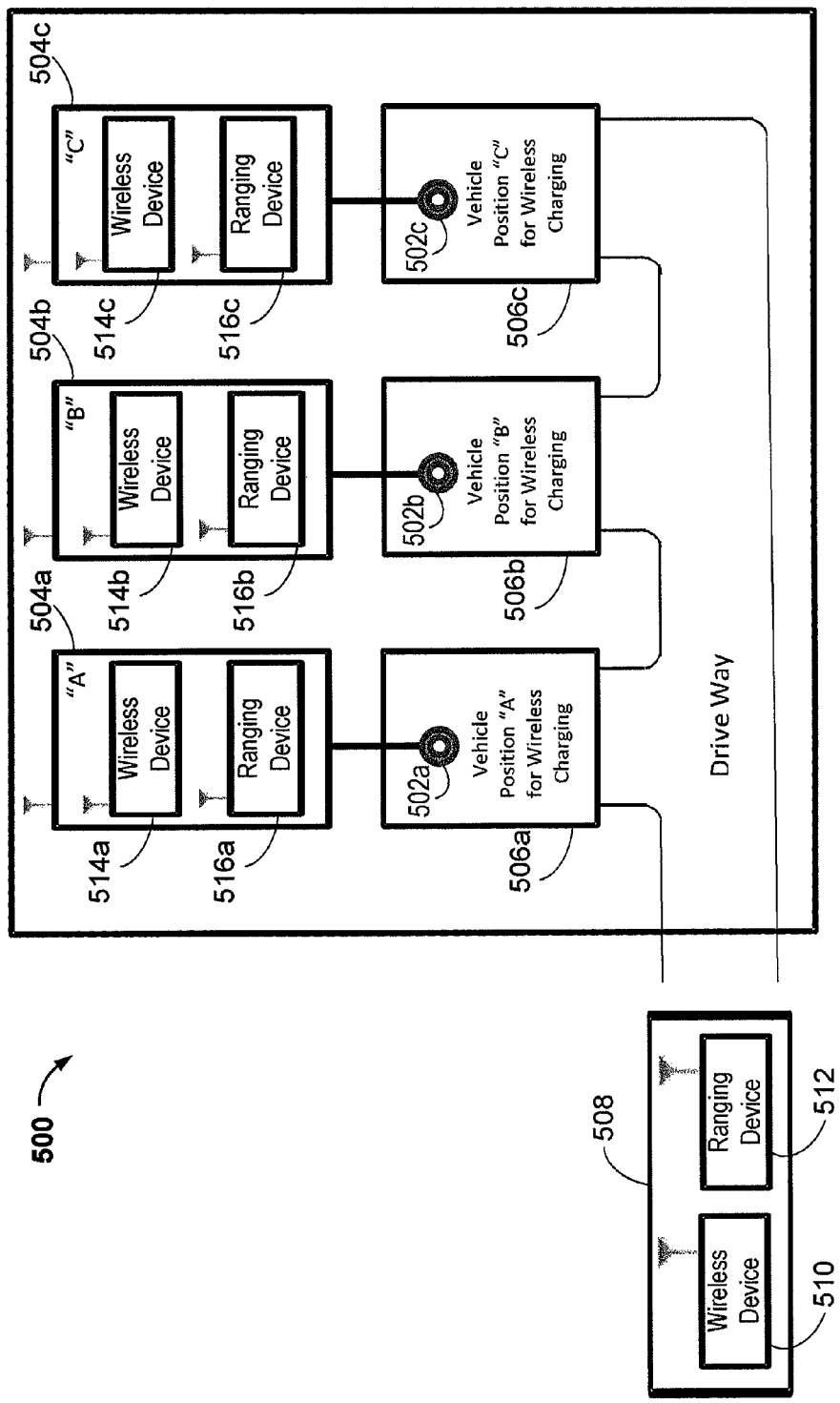
FIG. 5 illustrates a functional block diagram of a wireless power transfer system, in accordance with an exemplary embodiment.

FIG. 5 is a functional block diagram of an exemplary multi-vehicle and multi-parking parking and charging system 500, in accordance with various implementations. The components illustrated in FIG. 5 may be used in the wireless power transfer system 100 of FIG. 1, in accordance with various embodiments. In one embodiment, the parking and charging system 500 may include a plurality of parking spaces 506a, 506b, and 506c, and a plurality of charging stations 504a, 504b, and 504c corresponding to each parking space that allow the system 500 to simultaneously charge a plurality of vehicles, such as vehicle 508. In some embodiments, a charging station may include a Base Controller Unit (BCU), such as the BCU described below with respect to FIG. 6. In some embodiments, a charging station may include a BCU and a base pad (e.g., base pad 502a). In some embodiments, a charging station may include a controller (e.g., controller 612 of FIG. 6), a ranging device (e.g., ranging device 516a), and a wireless communication device (e.g., device 514a). In some embodiments, the charging station may further include a power supply unit, such as the power supply unit 606 illustrated in FIG. 6.

In some embodiments, the plurality of parking spaces 506a-506c are each marked with a space indicator, such as a letter or a number. For example, a sign of a charging station may be provided on the parking space so as to allow a driver to identify the charging station. As shown in FIG. 5, a parking space 506a with a charging station 504a including the base pad 502a may be marked with a space indicator "A." A parking space 506b with a charging station 504b including the base pad 502b may be marked with a space indicator "B." A parking space 506c with a charging station 504c including the base pad 502c may be marked with a space indicator "C." The space indicators may assist a user to identify available charging stations in the parking and charging system 500.

Vehicle 508 may include a wireless communication device 510 and a ranging device 512. The wireless communication device 510 may be used to communicate with each of a plurality of wireless communication devices (e.g., 514a-514c) located within each of the charging stations in the parking and charging system 500. The ranging device 512 may be used to determine distances between the vehicle 508 and each charging station of the plurality of charging stations. For example, the ranging device 512 may determine a distance between itself and a ranging device in one of the charging stations (e.g., ranging device 516a in charging station 504a). In some embodiments, the ranging device 512 may determine the distances by transmitting a prompt signal to each charging station of the plurality of charging stations, receiving a response signal from each charging station of the plurality of charging stations, and measuring a delay, for each charging station, between the prompt signal transmission by the ranging device 512 and the response signal reception by the ranging device 512. Further details regarding wireless communication device 510 and ranging device 512 will be discussed below with respect to FIG. 6. In some embodiments, as discussed below with respect to FIG. 6, the vehicle 508 may further include a controller 614 and a vehicle pad 624.

When a vehicle, such as electric vehicle 112 of FIG. 1 or vehicle 508 of FIG. 5, is driven into a parking and charging system (e.g., system 500) with a plurality of available charging stations, a driver of the vehicle is able to identify one or more of the charging stations and request charging from an identified charging station. In one embodiment, the driver of a vehicle may visually identify an available parking space with an available charging station using, for example, a space indicator as described above. Thus, a driver of the vehicle must navigate within the parking facility to find a proper charging station for providing energy to charge the vehicle. When a driver approaches a parking space, or once the driver is parked in a parking space, the vehicle may attempt to pair with every charging station within its communication range. Without proper identification of a desired charging station, the vehicle may select and connect to a charging station that is not associated with the parking spot within which the vehicle is located.

Figure 6:
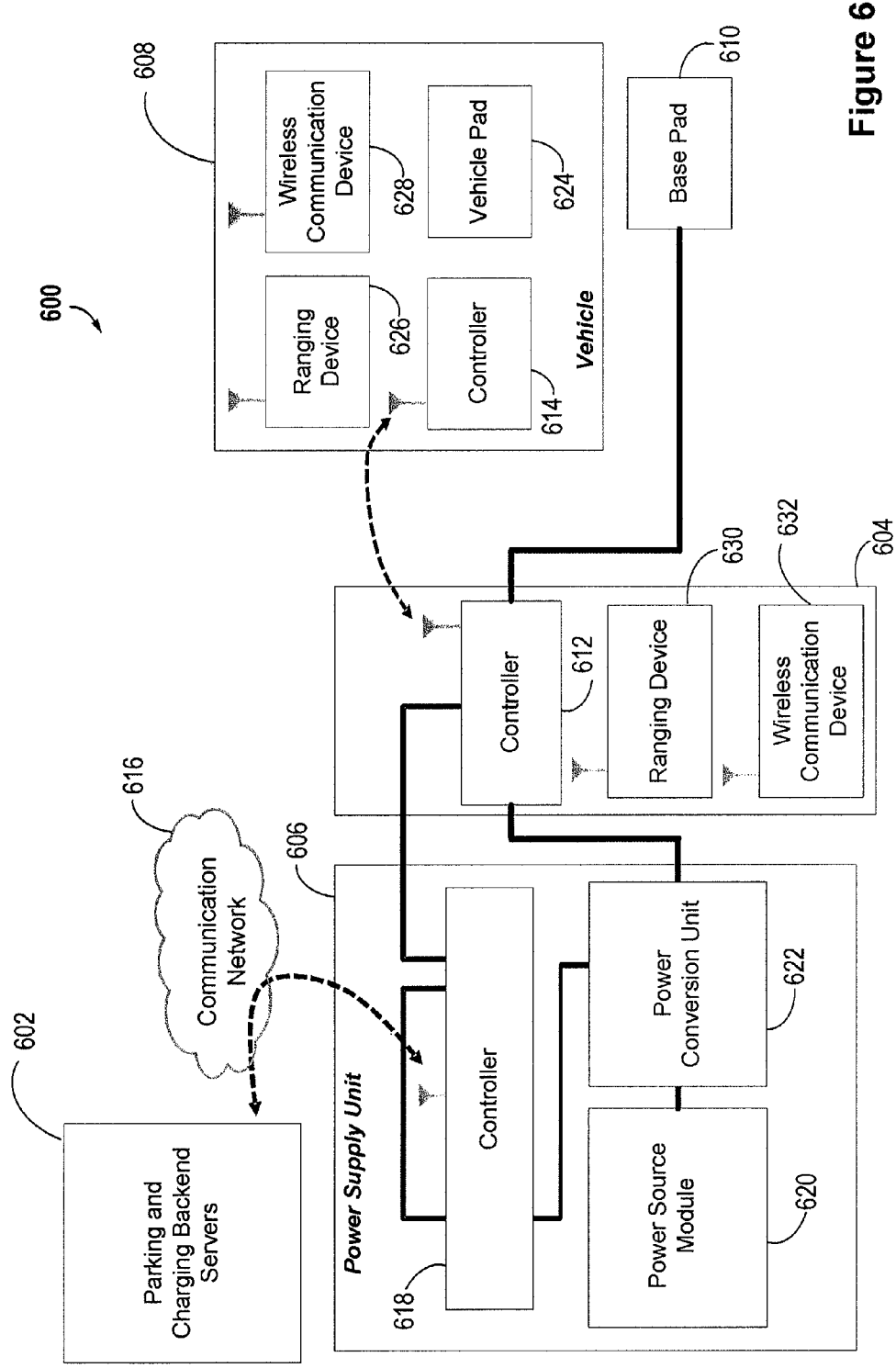
FIG. 6 illustrates a functional block diagram of an exemplary multi-vehicle and multi-parking lot system, in accordance with various embodiments.

FIG. 6 illustrates a functional block diagram of exemplary components of a wireless power transfer system 600 that efficiently and effectively facilitates the identification of a charging station for a vehicle. The components illustrated in FIG. 6 may be used in the wireless power transfer system 100 of FIG. 1 and/or the parking and charging system 500 of FIG. 5, in accordance with various embodiments. The wireless power transfer system 600 comprises one or more parking and charging backend servers 602, a power supply unit 606, a charging station 604, a base pad 610, and a vehicle 608. In some embodiments, the charging station 604 may include the base pad 610. In some embodiments, a charging station 604 may further include the power supply unit 606. In other embodiments, the charging station 604 and the power supply unit 606 are separate components and may communicate via wired or wireless communications.

The power supply unit 606 may include an input that receives power from a main power supply and feeds into power source module 620. The power supply unit 606 may also include a controller 618 for controlling operations of the power supply unit 606. In some aspects, the controller 618 may include a graphical user interface (GUI)/communication module. For example, the GUI/communication module may allow a user to communicate with the system via a user input device, such as a touchscreen, a keypad, or any other suitable user input device. The controller 618, using, for example, a GUI/communication module, may also allow the power supply unit 606 to communicate with the one or more parking and charging backend servers 602 via network 616. The network 616 may be any type of communication network such as, for example, the Internet, a wide area network (WAN), a wireless local area network (WLAN), etc. The power supply unit 606 also may include a power conversion unit 622 that may receive power from the power source module 620 and output power to the charging station 604 using, for example, a wired or wireless (e.g., a power transmitter antenna) connection. In some embodiments, the power conversion unit 622 is located in the charging station 604.

In some embodiments, the charging station 604 may include a Base Controller Unit (BCU). In some embodiments, the BCU may include the controller 612. In other embodiments, the BCU may include the controller 612 and the base pad 610. In some embodiments, the BCU 604 may include the controller 612, a ranging device 630, and a wireless communication device 632. In some embodiments, the charging station 604 may also include the power conversion unit 622, which may receive power from the power source module 620 and may convert and output the power to the base pad 610. In some aspects, the charging station 604 may be separate from the power supply unit 606 and operate as a stand-alone unit. In other aspects, the charging station 604 may be part of the power supply unit 606. In some aspects, the base pad 610 may be included in the charging station 604. In other aspects, the base pad 610 is separate from the charging station 604 and/or the BCU. The base pad 610 may include a base system induction coil, such as the base system induction coil 104 illustrated in FIG. 1.

The controller 612 may include an antenna that may be used to communicate with a vehicle 608 via a vehicle antenna. In some aspects, the charging station 604 may include a transmitter and a receiver, or a transceiver, to communicate with a transmitter and a receiver, or a transceiver, of the vehicle 608. The vehicle 608 may include a Vehicle Controller Unit (VCU) that may include the controller 614. In some aspects, the VCU may include the controller 614 and vehicle pad 624. In some aspects, the VCU may include the controller 614, the vehicle pad 624, the ranging device 626, and the wireless communication device 628. The communication channel between the charging station 604 (e.g., the BCU) and the vehicle (e.g., the VCU) may be any type of communication channel, such as, for example, dedicated short-range communications (DSRC), Bluetooth, WiFi, zigbee, cellular, WLAN, etc.

In response to communications between the charging station 604 and vehicle 608, the charging station 604 may communicate with the power supply unit 606 and/or the one or more parking and charging backend servers 602. Upon receiving a request for power from the vehicle 608, the charging station 604 may determine whether communication is needed with the power supply unit 606 and/or the one or more of parking and charging backend servers 602. In some embodiments, the charging station 604 may communicate with the one or more parking and charging backend servers 602 via the power supply unit 606. In other embodiments, the charging station 604 may communicate directly with the one or more parking and charging backend servers 602. In some embodiments, the controller 612 of the charging station 604 may include a graphical user interface (GUI)/communication module. For example, the GUI/communication module may allow a user to communicate with the system via a user input device, such as a touchscreen, a keypad, or any other suitable user input device. If the charging station 604 determines that communication with the one or more parking and charging backend servers 602 and/or the power supply unit 606 is needed, the controller 612 may use the GUI/communication module to set up a wired or wireless communication link. The GUI/communication module may include an embedded communication module that may be wired or wireless. The GUI/communication module may be used to setup the communication links between the charging station 604 and the one or more parking and charging backend servers 602 and/or the power supply unit 606.

The charging station 604 may further include a wireless communication device 632 and a ranging device 630. The ranging device 630 may be used to determine a distance between the vehicle 608 and the charging station 604. For example, the ranging device 630 may be used to determine a distance between itself and the ranging device 626 in the vehicle 608. The wireless communication device 632 may be used to communicate with each of a plurality of vehicles, such as vehicle 608, that request power transfer from the charging station 604. For example, the wireless communication device 632 may be used for communications between the BCU and various VCUs. Details regarding specific communications between charging station BCUs and VCUs will be discussed in more detail below.

The vehicle 608 includes a controller 614, a vehicle pad 624, a ranging device 626, and a wireless communication device 628. The controller 614 and/or the wireless communication device 628 may include a transmitter and a receiver, or a transceiver, for communicating with the charging station 604 and/or the power supply unit 606. As previously discussed, the vehicle 608 may include a Vehicle Controller Unit (VCU). The VCU may include the controller 614 and/or the vehicle pad 624. In some aspects, the VCU may include the controller 614, the vehicle pad 624, the ranging device 626, and the wireless communication device 628. The wireless communication device 628 may be used to communicate with the charging station 604, as discussed above. The ranging device 626 may be used to determine a distance between the vehicle 608 and the charging station 604. For example, the ranging device 626 may determine a distance between itself and the ranging device 630. In some embodiments, the distance may be determined automatically and without user intervention. In some embodiments, the distance may be determined seamlessly without the driver's knowledge.

In some embodiments, each charging station (e.g., the BCU or wireless communication device of each charging station) of a plurality of charging stations in a parking and charging facility may be in discovery mode until the charging station is connected with a vehicle. For example, the BCU of a charging station may periodically broadcast a discovery signal until a vehicle connects with the BCU. As another example, the BCU may wait for a signal to be received from a vehicle attempting to connect to the charging station. In some embodiments, each vehicle (e.g., the VCU or wireless communication device of each vehicle) may constantly be in a searching mode when in proximity to one or more charging stations, where the vehicle continuously searches for a connection with a charging station (e.g., a wireless communication device of a charging station). In some embodiments, a ranging device of a vehicle may begin determining a range or a distance automatically upon sensing a charging station in proximity to the vehicle. For example, a ranging device may begin automatically performing ranging (i.e., determining a distance or a range) when the VCU senses a wireless communication device signal from a charging station.

In some embodiments, the ranging device 626 may determine a distance from the charging station 604 by transmitting a signal to the ranging device 630, receiving a response signal from the ranging device 630 (e.g., an acknowledgment (ACK) signal), and measuring a delay between the transmission of the signal and the receiving of the response signal. The vehicle 608 may transmit and receive signals to and from each of a plurality of other charging stations in the parking and charging facility in a similar manner to determine distances from each charging station. The delay, or latency, between the transmitted and received signals can be used by the vehicle 608 to measure the distances from the respective charging stations and to determine the charging station that is closest to the vehicle 608 (e.g., charging station 604). For example, based on the determined distances, the vehicle may selectively choose to communicate with a particular charging station, such as the charging station closest to the vehicle 608. In some embodiments, the ranging device 626 may determine whether at least one of the distances (e.g., the shortest of the distances, a selected one or more of the distances, or each of the distances) is below a detection threshold value. The detection threshold value may be, for example, a foot or less (e.g., within 4 inches). For example, once the distance between the vehicle and the charging station falls below the detection threshold value, the vehicle 608 (e.g., the VCU of the vehicle) may begin a wireless communications device pairing process. Those skilled in the art will appreciate that any method of determining the distance between a vehicle 608 and a charging station 604 may be used. For example, a vehicle 608 may determine the distance by performing triangulation techniques using satellites that are used by the on-board navigation system of the vehicle 608. In addition, the vehicle 608 and/or the charging station 604 may have one or more proximity sensors that allow the vehicle 608 and/or the charging station 604 to determine the distances.

In some embodiments, if only one charging station wireless communication device is within the communication range of the vehicle wireless communication device, the vehicle may only attempt to pair with the wireless communication device of that charging station (e.g., the charging station corresponding to the parking spot in which the vehicle is parked). In some embodiments, if more than one charging station falls within the communication range of the vehicle wireless communication device, the vehicle 608 may attempt to pair with each of the wireless communication devices. If this occurs, the vehicle may determine the wireless communication device of the charging station corresponding to the parking spot in which the vehicle is parked by determining an identification of the wireless communication device. In some embodiments, each of the ranging device and the wireless communication device of each charging station have a unique identification (ID) associated therewith. In some embodiments, the vehicle 608 may detect an ID of a ranging device located in one of the charging stations based on the determined distance. For example, the vehicle 608 may detect the ID of the charging station ranging device that is located the shortest distance away from the vehicle ranging device 626, such as ranging device 630 of charging station 604. The vehicle 608 may then determine an ID of the wireless communication device 632 of the charging station 604 based on the detected ranging device 630 ID. For example, the ranging device 630 ID and the wireless communication device 632 ID may be identical. As another example, the wireless communication device 632 ID may be derived from the ranging device 630 ID. The vehicle wireless communication device 628 may then transmit the determined charging station wireless communication device 632 ID to the charging station 604 in order to pair with the wireless communication device 632. In some embodiments, the charging station wireless communication device 632 may then authenticate the ID and, upon a successful authentication, pair with the vehicle wireless communication device 628. The communication link between the wireless communication devices may be any type of communication link such as, for example, dedicated short-range communications (DSRC), Bluetooth, WiFi, zigbee, cellular, WLAN, etc.

Once the wireless communication devices of the charging station 604 and vehicle 608 have been paired and a communication link is established, various power transfer operations may occur. In some embodiments, the communication link may be used to transmit information between the vehicle controller 614 and the charging station controller 612. For example, a driver of vehicle 608 may initiate charging via the communication link. Further, a driver may make a payment via the communication link for the amount of charge received. As another example, the communication link may be used to transmit information from the charging station to the user, such as an amount of time left until the vehicle is charged, the cost that is accruing as the charging progresses, etc.

In some embodiments, the communication link between the wireless communication devices may be used to initiate the transmission of a sense current from the power supply unit 606 or the charging station 604 to the base pad 610. For example, a driver of the vehicle 608 may request via the communication link that a sense current is provided from the power supply unit 606. The sense current may be used to align the base pad with the vehicle pad in order to maximize efficiency of the power transfer, as described above. Any current level that is sufficient to provide enough power to align the base pad with the vehicle pad may be used as the sense current. In some aspects, the power supply unit 606 or the charging station 604 may energize the base pad 610 with a current that is no more than 10% of a maximum threshold current level (e.g., the maximum track current, a specified safety level, etc.). In other aspects, the base pad with may be energized with a current that is no more than 50% of the maximum threshold current level. In some aspects, the charging station 604 may cause the base pad 610 to move in order to align the base pad 610 with the vehicle pad 624. In some aspects, the charging station 604 may cause the vehicle pad 624 to move in order to align the vehicle pad 624 with the base pad 610. In some aspects, the charging station 604 may cause both the vehicle pad 624 and base pad 610 to move simultaneously or one at a time.

In some embodiments, the communication link between the wireless communication devices of the vehicle and charging station may be used to initiate and/or terminate wireless power transfer for charging the vehicle 608. For example, a driver of the vehicle 608 may request via the communication link that a current is provided from the power supply unit 606 that is sufficient to charge a battery of the electric vehicle 608.

Figure 7A:
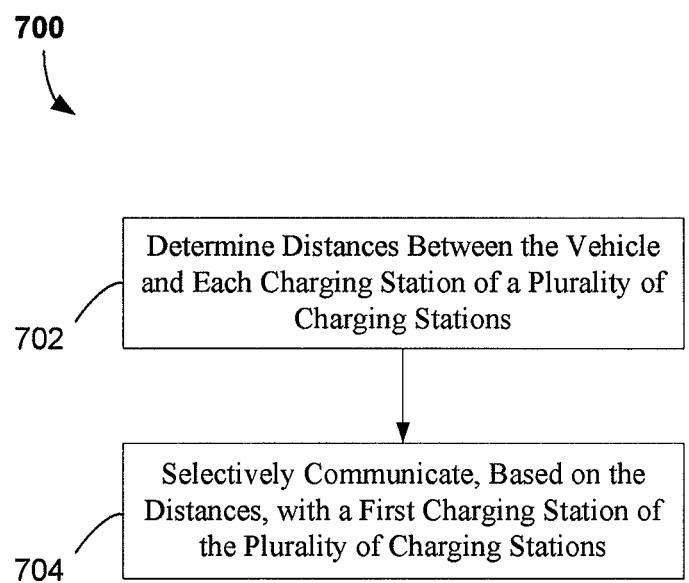
FIG. 7A illustrates a flowchart of an exemplary method of charging a vehicle.

FIG. 7A illustrates a flowchart 700 of an exemplary method of charging a vehicle. At step 702, the method begins by determining distances between the vehicle and each charging station of a plurality of charging stations. For example, as explained above, a vehicle may measure the delay, for each charging station of the plurality of charging stations, between the transmission of a signal transmitted to the charging station and the reception of a response signal from the charging station. At step 704, the method continues by selectively communicating, based on the distances, with a first charging station of the plurality of charging stations. For example, based on the determined distances, the vehicle may selectively choose to communicate with the charging station that is closest to the vehicle. In some embodiments, the method may determine whether the distance between the vehicle and the first charging station is below a threshold value, such as the detection threshold value discussed above. For example, a vehicle may selectively communicate with the first charging station (e.g., charging station 604) if the distance between the vehicle and the first charging station is below the threshold value. In some embodiments, the method may detect an identification of a ranging device included in the first charging station based on the distance between the vehicle and the first charging station and may determine an identification of a wireless communications device in the first charging station based on the identification of the ranging device. For example, the ranging device identification and the wireless communication device identification may be identical, and, as explained above, a vehicle wireless communication device may transmit the determined charging station wireless communication device identification to the charging station in order to pair with the charging station wireless communication device. The method may continue by receiving an alignment signal from the first charging station for aligning the vehicle with the first charging station and/or receiving a charging signal from the first charging station sufficient to charge the vehicle.

In certain embodiments, selectively communicating with the first charging station can comprise establishing a communication link with the first charging station. For example, the communication link can be a persistent link across which the vehicle can transmit its charging parameters to the first charging station.

Figure 7B:
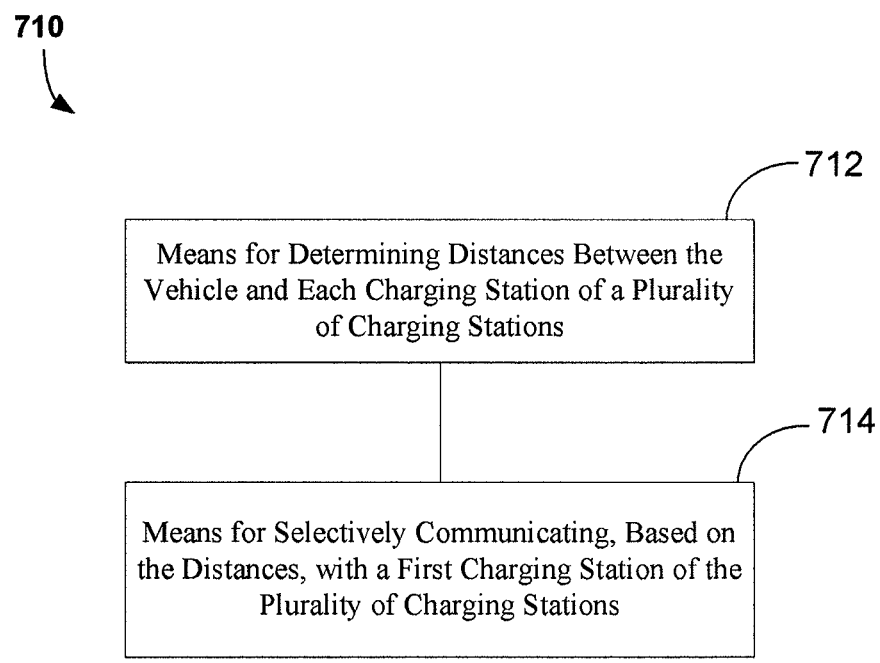
FIG. 7B illustrates a functional diagram of an exemplary apparatus for charging a vehicle.

FIG. 7B is a functional block diagram of an example apparatus 710, in accordance with an exemplary embodiment of the invention. Those skilled in the art will appreciate that an apparatus may have more components than the simplified apparatus 710 shown in FIG. 7B. The apparatus 710 shown includes only those components useful for describing some prominent features of implementations within the scope of the claims. Apparatus 710 comprises means 712 for determining distances between the vehicle and each charging station of a plurality of charging stations and means 714 for selectively communicating, based on the distances, with a first charging station of the plurality of charging stations.

The means 712 for determining the distances may be configured to perform one or more of the functions discussed above with respect to block 702 illustrated in FIG. 7A. The means 712 for determining the distances may correspond to one or more of the ranging device 626 and the controller 614, discussed above with respect to FIG. 6. The means 714 for selectively communicating may be configured to perform one or more of the functions discussed above with respect to block 704 illustrated in FIG. 7A. The means 714 for selectively communicating may correspond to one or more of the wireless communication device 628, the controller 614, the transmitter, the receiver, and the transceiver, discussed above with respect to FIG. 6.

Figure 8:
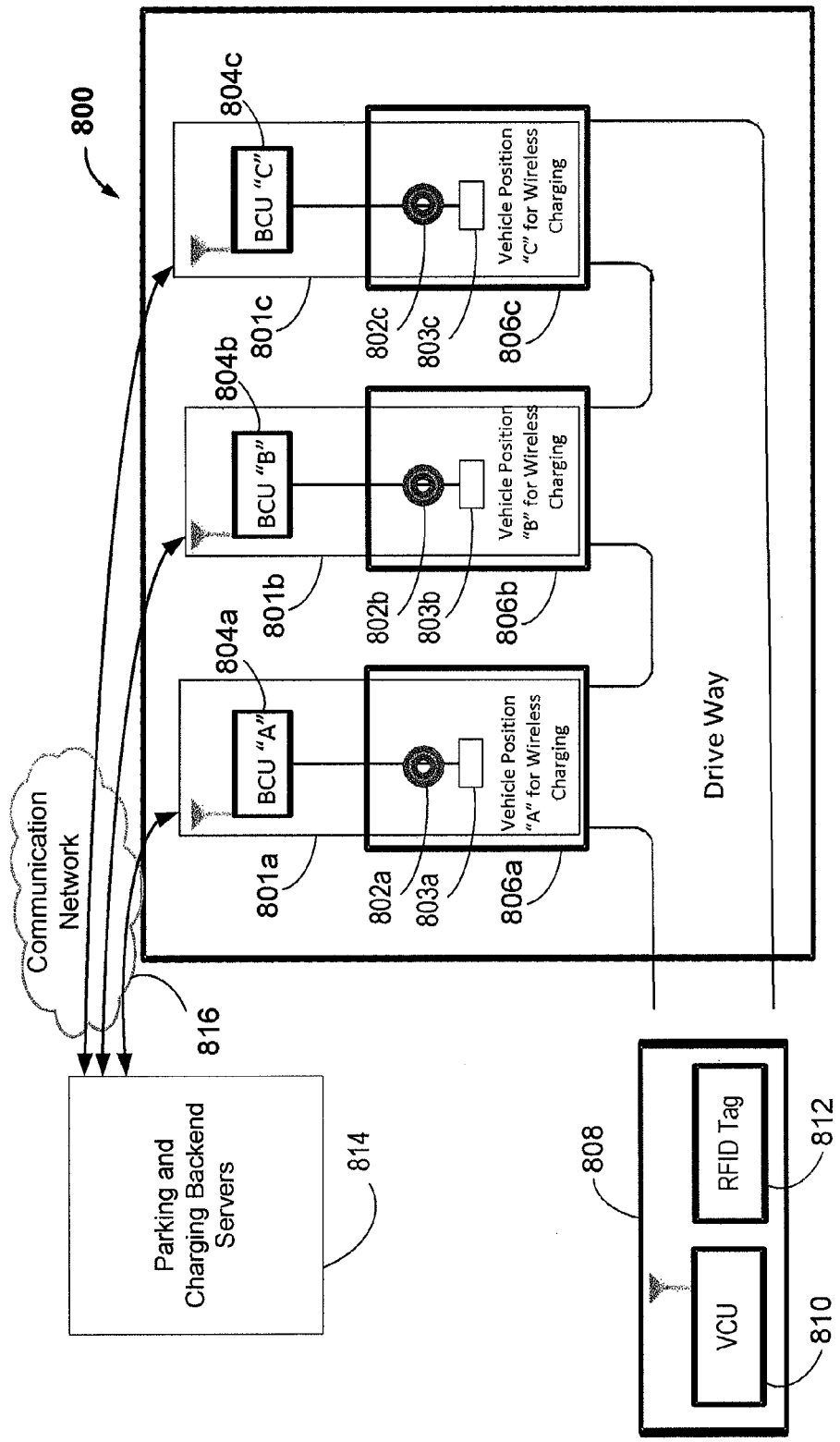
FIG. 8 is a functional block diagram of an exemplary multi-vehicle and multi-parking parking and charging system utilizing a RFID communication link, in accordance with various implementations.

FIG. 8 is a functional block diagram of an exemplary multi-vehicle and multi-parking and charging system 800 utilizing an RFID communication link, in accordance with various implementations. The components illustrated in FIG. 8 may be used in the wireless power transfer system 100 of FIG. 1 and/or in the multi-parking and charging system 500 of FIG. 5, in accordance with various embodiments. For example, the RFID readers 803a-c of the system 800 and the RFID tag 812 of the vehicle 808, can be used as the ranging devices 516a-c of the system 500 and the ranging device 512 of the vehicle 508, respectively, to identify a charging station among multiple charging stations for charging the vehicle in accordance with certain embodiments described herein.

In one embodiment, the parking and charging system 800 may include a plurality of charging stations 801a-c, each corresponding to one of a plurality of parking spaces 806a-c, that allow the system 800 to simultaneously charge a plurality of vehicles, such as an electric vehicle 808. In some embodiments, each charging station 801a-c may include a Base Controller Unit (BCU) (e.g., BCUs 804a-c), a base pad (e.g., base pads 802a-c), and/or a Radio Frequency Identification (RFID) reader (e.g., RFID readers 803a-c). The charging stations 801a-c may communicate with one or more parking and charging backend servers 814 via a network 816. The network 816 may be any type of communication network such as, for example, the Internet, a wide area network (WAN), a wireless local area network (WLAN), etc.

In some embodiments, each charging station 801a-c can correspond to the base wireless charging system 302, discussed above with respect to FIG. 3. For example, the BCUs 801a-c can correspond to the base charging system controller 342, the base pads 802a-c can correspond to the base system induction coil 304, and each charging station 801a-c can include the base charging communication system 372. In other embodiments, the charging system 800 may include one or more base wireless charging systems 302, which can each include a plurality of each system component such as the base charging system controller 342, and the base system induction coil 304. In addition, in some embodiments, each charging station 801a-c can correspond to the charging station 604 of FIG. 6. In various embodiments, the RFID readers 803a-c can be placed curbside, on the ground next to the base pads 802a-c, and/or integrated directly into the base bad 802a. The charging stations 801a-c can include multiple RFID readers. In various embodiments, each charging station 801a-c can include an RFID tag (not shown), instead of, or in addition to, the RFID readers 803a-c.

In some embodiments, as described above with regard to FIG. 5, the plurality of parking spaces 806a-c are each marked with a space indicator, such as a letter or a number. For example, a sign of a charging station may be provided on the parking space so as to allow a driver to identify the corresponding charging station 801. As shown in FIG. 8, the parking space 806a, corresponding to the charging station 801a, the BCU 804a, and the base pad 802a, may be marked with a space indicator "A." The parking space 806b, corresponding to the charging station 801b, the BCU 804b, and the base pad 802b, may be marked with a space indicator "B." The parking space 806c, corresponding to the charging station 801c, the BCU 804c, and the base pad 802c, may be marked with a space indicator "C." The space indicators may assist a user to identify available charging stations 801a-c in the parking and charging system 800.

The electric vehicle 808 may include a Vehicle Controller Unit (VCU) 810 and wireless communication device 810 and an RFID tag 812. In an embodiment, the electric vehicle 808 can be the vehicle 112 (FIG. 1). The electric vehicle 808 can include the electric vehicle charging system 314, described above with respect to FIG. 3. For example, the VCU 810 can correspond to the electric vehicle controller 344, and the electric vehicle 808 can include the electric vehicle communication system 374. The electric vehicle 808 may include multiple RFID tags. In various embodiments, the electric vehicle 808 can include an RFID reader (not shown), instead of, or in addition to, the RFID readers tag 812.

The electric vehicle communication system 374 may be used to communicate with one or more of a plurality of base charging communication systems 372 located within each of the charging stations 801a-c in the parking and charging system 800. As discussed above, with respect to FIG. 3, the electric vehicle communication system 374 can communicate with the base charging communication system 372 by any wireless communication system such as Dedicated Short-Range Communications (DSRC), IEEE 802.11x (e.g., WiFi), Bluetooth, zigbee, cellular, etc. Accordingly, in some embodiments, the electric vehicle communication system 374 can act as a base station to which the base charging communication system 372 can connect. In other embodiments, each base charging communication system 372 can act as a base station to which the electric vehicle communication system 374 can connect.

As described above with regard to FIG. 5, when the electric vehicle 808 of FIG. 8, enters the parking and charging system 800 with the plurality of available charging stations 801a-c, a driver of the vehicle is able to identify one or more of the charging stations 801 and request charging from an identified charging station 801. In one embodiment, the driver of a vehicle may visually identify an available parking space 806 with an available charging station 801 using, for example, a space indicator as described above. Thus, a driver of the vehicle may navigate within the parking facility to find a proper charging station 801 for providing energy to charge the electric vehicle 808. When a driver approaches a parking space 801, or once the driver is parked in a parking space, one or more charging stations 801a-c may attempt to pair with one or more vehicles 808 within communication range. Without proper identification of a desired pairing between the specific electric vehicle 808 and charging station 801, one or more charging stations 801 may select and connect to a electric vehicle 808 that is not associated with the parking spot 806 within which the vehicle is located.

In an embodiment, each VCU 810 can have a globally or locally unique identifier (e.g., "VCU1"), which the electric vehicle communication system 374 can broadcast. For example, in an embodiment using the DSRC standard, the electric vehicle communication system 374 can broadcast a WAVE Basic Service Set (WBSS) ID of "VCU1." The RFID tag 812 can be programmed to indicate the ID of the VCU 810, and/or the broadcast identifier (e.g., "VCU1"). Accordingly, when the electric vehicle 808 enters a parking space such as the parking space 806a, the RFID reader 803a can read the identifier of the VCU 810 from the RFID tag 812. Because the RFID reader 803a can have a shorter communication range than the base charging communication system 372, the RFID reader 803a may only be capable of reading RFID tags 812 within the parking space 806a. The BCU 804a can obtain the identifier of the VCU 810 from the RFID tag 812, and can cause the base charging communication system 372 to connect to the appropriate electric vehicle communication system 374. In this way, certain embodiments described herein are able to identify the vehicle, authenticate the vehicle, and set up a communication link with the parking space, without or with only minimal driver intervention.

In one example such implementation, as the electric vehicle 808 enters a parking space 806, the RFID reader 803 for that parking space 806 can scan and read the RFID tag 812 of the electric vehicle 808 to receive information (e.g., a vehicle identifier) from the electric vehicle 808. The received information (e.g., the vehicle identifier) can be transmitted by the RFID reader 803 to the BCU 804 of the parking space 806 (e.g., through internal wired connectivity). The received information can be used by the system 800 to initiate further communication and/or to initiate an alignment process. For example, after having received the vehicle identifier via a first communication link (e.g., RFID, using the RFID tag 812 and the RFID reader 803), the BCU 804 can use DSRC and scan for a beacon signal comprising a vehicle WBSS broadcast by a VCU 810 of the electric vehicle 808. Upon detecting the beacon signal with the vehicle identifier received via the RFID communication link, the BCU 804 can join with the VCU 810 to form a second communication link (e.g., DSRC), thereby forming a point-to-point connection through which VCU-BCU communication can proceed.

In one embodiment, when an RFID reader 803 detects the RFID tag 812, the corresponding charging station 801 can start a sense current at the base pad 803. The sense current can be used to help align the electric vehicle 808 with the base pad 803. In an embodiment where the electric vehicle 808 includes an RFID reader, the charging station 801 can start the sense current when the electric vehicle 808 reads the RFID tag of the charging station 801 and connects via the base charging communication system 372.

In an embodiment, the roles of the electric vehicle 808 and the charging station 801 can be reversed. In other words, the charging station 801 can include an RFID tag (not shown), and the electric vehicle 808 can include an RFID reader (not shown). Each base charging communication system 372 can act as a base station to which the electric vehicle communication system 374 can connect. Each BCU 804 can have a globally or locally unique identifier (e.g., "BCU1"), which the base communication system 372 can broadcast. For example, in an embodiment using the DSRC standard, the base charging communication system 372 can broadcast a WBSS ID of "BCU1." The RFID tag of the charging station 806 can be programmed to indicate the ID of the BCU 804, and/or the broadcast identifier (e.g., "BCU1"). Accordingly, when the electric vehicle 808 enters a parking space such as the parking space 806a, the RFID reader on the vehicle can read the identifier of the BCU 804 from the RFID tag of the charging station 806a. Because the RFID reader on the electric vehicle 808 can have a shorter communication range than the eclectic vehicle communication system 374, the RFID reader may only be capable of reading RFID tags in the parking space 806a. The VCU 810 can obtain the identifier of the BCU 804a from the RFID tag, and can cause the electric vehicle communication system 374 to connect to the appropriate base charging communication system 372.

In one example such implementation, as the electric vehicle 808 enters a parking space 806, the RFID reader on the vehicle can scan and read the RFID tag of the BCU 804 of the parking space 806 to receive information (e.g., a BCU identifier) from the BCU 804. The received information (e.g., the BCU identifier) can be transmitted by the RFID reader to the VCU 810 of the electric vehicle 808 (e.g., through internal wired connectivity). The received information can be used by the electric vehicle 808 to initiate further communication and/or to initiate an alignment process. For example, after having received the BCU identifier via a first communication link (e.g., RFID, using the RFID tag and the RFID reader), the VCU 810 can use DSRC and scan for a beacon signal comprising a BCU WBSS broadcast by a BCU 804. Upon detecting the beacon signal with the BCU identifier received via the RFID communication link, the VCU 810 can join with the BCU 804 to form a second communication link (e.g., DSRC), thereby forming a point-to-point connection through which VCU-BCU communication can proceed.

Once a communication link is established between the electric vehicle 808 and the charging station 801 corresponding to appropriate parking space 806, the communication link can be used for one or more of: electric vehicle guidance, electric vehicle alignment, charging control, status communication, authorization and/or identification, payment management, etc.

Figure 9:
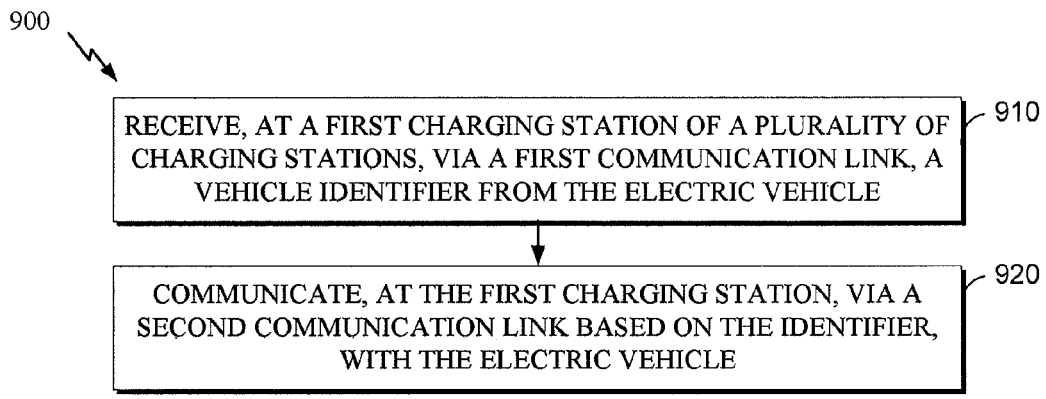
FIG. 9 illustrates a flowchart of an exemplary method of providing wireless power to an electric vehicle.

FIG. 9 illustrates a flowchart 900 of an exemplary method of providing wireless power to an electric vehicle. Although the method of flowchart 900 is described herein with reference to the multi-vehicle and multi-parking parking and charging system 800, discussed above with respect to FIG. 8, a person having ordinary skill in the art will appreciate that the method of flowchart 900 may be implemented by another device described herein, or any other suitable device. In an embodiment, the steps in flowchart 900 may be performed by a processor or controller such as, for example, the BCU 804a-c and/or the VCU 810 (FIG. 8). Although the method of flowchart 900 is described herein with reference to a particular order, in various embodiments, blocks herein may be performed in a different order, or omitted, and additional blocks may be added.

First, at block 910, a first charging station (such as, for example, the charging station 801a) of a plurality of charging stations receives a vehicle identifier from the electric vehicle 808. The charging station 801a receives the vehicle identifier via a first communication link such as, for example, an RFID link. In an embodiment, as the electric vehicle 808 enters the parking space 806*a*, the RFID reader 803*a* reads the vehicle identifier from the RFID tag 812 located on the electric vehicle 808. The RFID tag 812 can be a passive tag that can be energized by the RFID reader 803*a* or by the charging pad 802*a*.

The vehicle identifier can indicate a base station identifier associated with the electric vehicle 808 such as, for example, a WBSS of the electric vehicle communication system 374. The vehicle identifier can include the base station identifier as an encoded or un-encoded string. In an embodiment, the BCU 804*a* can map the vehicle identifier to the base station identifier of the electric vehicle 808.

Then, at block 920, the charging station 801*a* communicates with the electric vehicle 808 via a second communication link. The second communication link can be based on the received vehicle identifier. For example, after the BCU 804*a* maps the vehicle identifier to the base station identifier of the electric vehicle 808, the base charging communication system 372 can connect to the electric vehicle communication system 374 broadcasting the mapped base station identifier. The second communication link can include any of Dedicated Short-Range Communications (DSRC), IEEE 802.11x (e.g., WiFi), Bluetooth, zigbee, cellular, etc. The second communication link can be used for one or more of: electric vehicle guidance, electric vehicle alignment, charging control, status communication, authorization and/or identification, and payment management.

Figure 10:
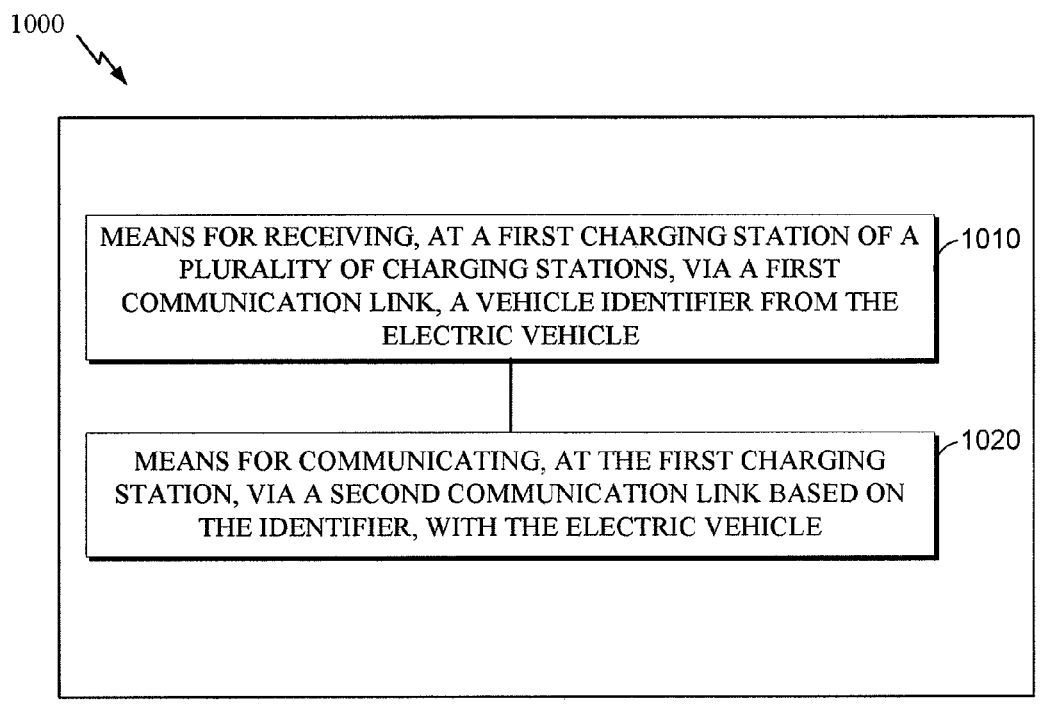
FIG. 10 is a functional block diagram of a wireless power apparatus, in accordance with an exemplary embodiment of the invention.

FIG. 10 is a functional block diagram of a wireless power apparatus 1000, in accordance with an exemplary embodiment of the invention. Those skilled in the art will appreciate that a wireless power apparatus may have more components than the simplified wireless communication device 1000 shown in FIG. 10. The wireless power apparatus 1000 shown includes only those components useful for describing some prominent features of implementations within the scope of the claims. The wireless power apparatus 1000 includes means 1010 for receiving, at a first charging station of a plurality of charging stations, via a first communication link, a vehicle identifier from the electric vehicle, and means 1020 for communicating, at the first charging station, via a second communication link based on the identifier, with the electric vehicle.

In an embodiment, the means 1010 for receiving, at a first charging station of a plurality of charging stations, via a first communication link, a vehicle identifier from the electric vehicle can be configured to perform one or more of the functions described above with respect to block 910 (FIG. 9). In various embodiments, the means 1010 for receiving, at a first charging station of a plurality of charging stations, via a first communication link, a vehicle identifier from the electric vehicle can be implemented by one or more of the RFID reader 803 (FIG. 8), the BCU 801 (FIG. 8), and the base pad 802 (FIG. 8).

In an embodiment, the means 1020 for communicating, at the first charging station, via a second communication link based on the identifier, with the electric vehicle can be configured to perform one or more of the functions described above with respect to block 920 (FIG. 9). In various embodiments, the means 1020 for communicating, at the first charging station, via a second communication link based on the identifier, with the electric vehicle can be implemented by one or more of the base charging communication system 372 (FIG. 8), the BCU 801 (FIG. 8), and the base pad 802 (FIG. 8).

Figure 11:
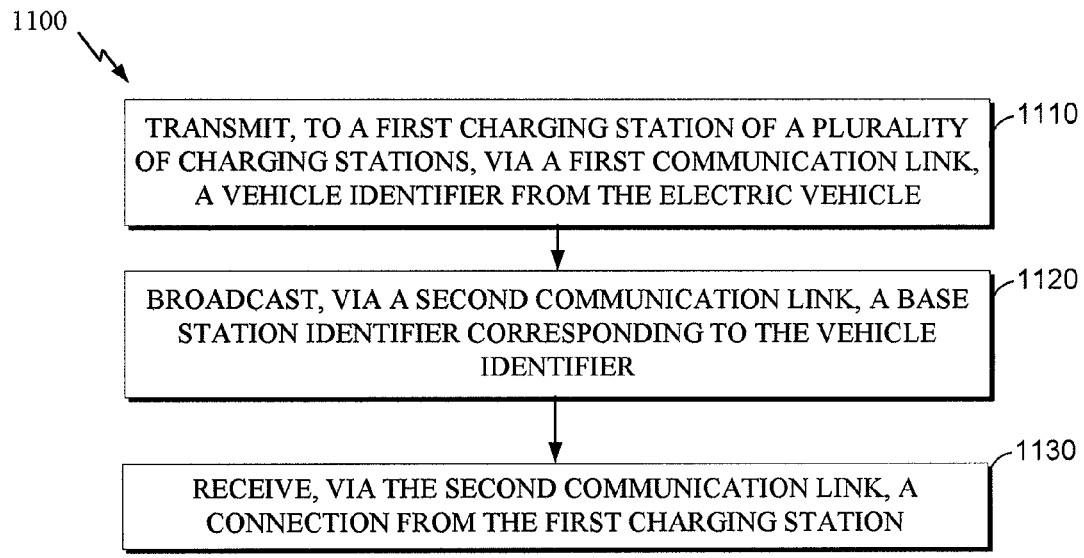
FIG. 11 illustrates a flowchart of another exemplary method of receiving wireless power at an electric vehicle.

FIG. 11 illustrates a flowchart 1100 of another exemplary method of receiving wireless power at an electric vehicle. Although the method of flowchart 1100 is described herein with reference to the multi-vehicle and multi-parking parking and charging system 800, discussed above with respect to FIG. 8, a person having ordinary skill in the art will appreciate that the method of flowchart 1100 may be implemented by another device described herein, or any other suitable device. In an embodiment, the steps in flowchart 1100 may be performed by a processor or controller such as, for example, the BCU 804*a*-*c* and/or the VCU 810 (FIG. 8). Although the method of flowchart 1100 is described herein with reference to a particular order, in various embodiments, blocks herein may be performed in a different order, or omitted, and additional blocks may be added.

First, at block 1110, the electric vehicle 808 transmits, to a first charging station (such as, for example, the charging station 801*a*) of a plurality of charging stations, a vehicle identifier. The electric vehicle 808 transmits the vehicle identifier via a first communication link such as, for example, an RFID link. In an embodiment, as the electric vehicle 808 enters the parking space 806*a*, the RFID reader 803*a* reads the vehicle identifier from the RFID tag 812 located on the electric vehicle 808. The RFID tag 812 can be an active tag or a passive tag that can be energized by the RFID reader 803*a* or by the charging pad 802*a*.

Next, at block 1120, the electric vehicle 808 broadcasts a base station identifier corresponding to the vehicle identifier. For example, the vehicle identifier can indicate a base station identifier associated with the electric vehicle 808 such as, for example, a WB SS of the electric vehicle communication system 374. The vehicle identifier can include the base station identifier as an encoded or un-encoded string. In an embodiment, the BCU 804*a* can map the vehicle identifier to the base station identifier of the electric vehicle 808. The electric vehicle communication system 374 can be configured to broadcast the base station identifier in accordance with, for example, any of Dedicated Short-Range Communications (DSRC), IEEE 802.11x (e.g., WiFi), Bluetooth, zigbee, cellular, etc.

Then, at block 1130, the electric vehicle 808 receives a connection from the charging station 801*a* via the second communication link. For example, after the BCU 804*a* maps the vehicle identifier to the base station identifier of the electric vehicle 808, the base charging communication system 372 can connect to the electric vehicle communication system 374 broadcasting the mapped base station identifier. Once the connection is established, the second communication link can be used for one or more of: electric vehicle guidance, electric vehicle alignment, charging control, status communication, authorization and/or identification, and payment management.

Figure 12:
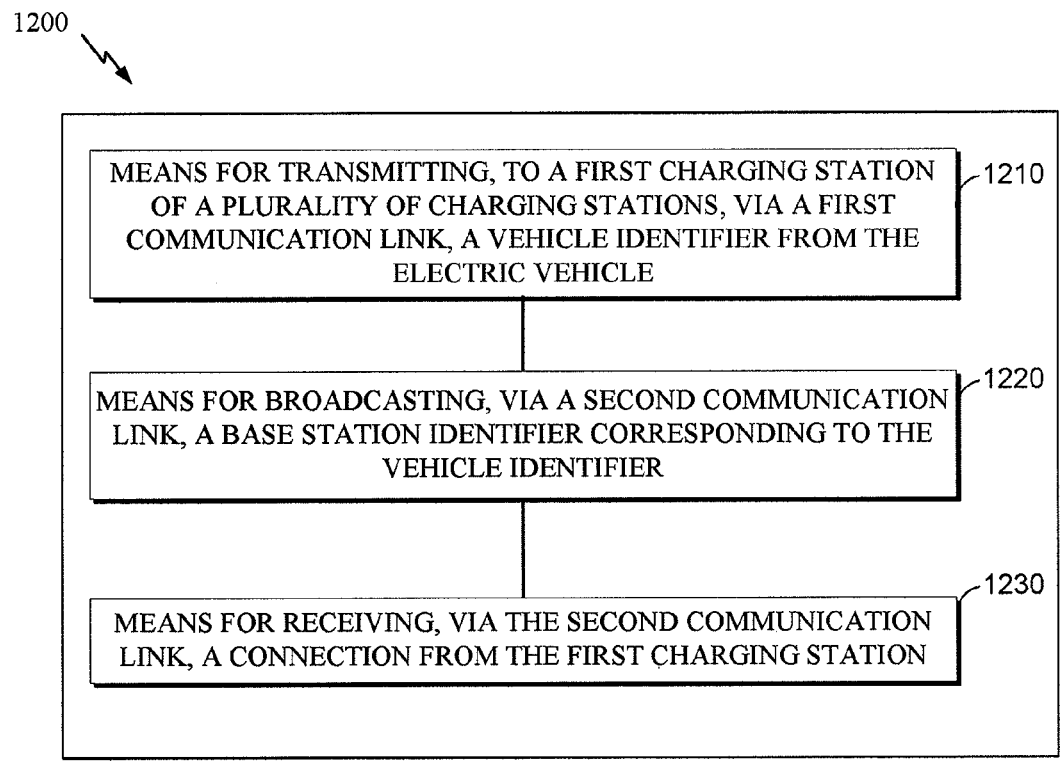
FIG. 12 is a functional block diagram of a wireless power apparatus, in accordance with another exemplary embodiment of the invention.

FIG. 12 is a functional block diagram of a wireless power apparatus 1200, in accordance with another exemplary embodiment of the invention. Those skilled in the art will appreciate that a wireless power apparatus may have more components than the simplified wireless communication device 1200 shown in FIG. 12. The wireless power apparatus 1200 shown includes only those components useful for describing some prominent features of implementations within the scope of the claims. The wireless power apparatus 1200 includes means 1210 for transmitting, to a first charging station of a plurality of charging stations, via a first communication link, a vehicle identifier from the electric vehicle, means 1220 for broadcasting, via a second communication link, a base station identifier corresponding to the vehicle identifier, and means 1230 for receiving, via the second communication link, a connection from the first charging station.

In an embodiment, the means 1210 for transmitting, to a first charging station of a plurality of charging stations, via a first communication link, a vehicle identifier from the electric vehicle can be configured to perform one or more of the functions described above with respect to block 1110 (FIG. 11). In various embodiments, the means 1210 for transmitting, to a first charging station of a plurality of charging stations, via a first communication link, a vehicle identifier from the electric vehicle can be implemented by one or more of the RFID reader 803 (FIG. 8), the RFID tag 812, and the VCU 810 (FIG. 8).

In an embodiment, the means 1220 for broadcasting, via a second communication link, a base station identifier corresponding to the vehicle identifier can be configured to perform one or more of the functions described above with respect to block 1120 (FIG. 11). In various embodiments, the means 1220 for broadcasting, via a second communication link, a base station identifier corresponding to the vehicle identifier can be implemented by one or more of the electric vehicle communication system 374 (FIG. 8), and the VCU 810 (FIG. 8).

In an embodiment, the means 1230 for receiving, via the second communication link, a connection from the first charging station can be configured to perform one or more of the functions described above with respect to block 1130 (FIG. 11). In various embodiments, the means 1230 for receiving, via the second communication link, a connection from the first charging station can be implemented by one or more of the electric vehicle communication system 374 (FIG. 8), and the VCU 810 (FIG. 8).

Figure 13:
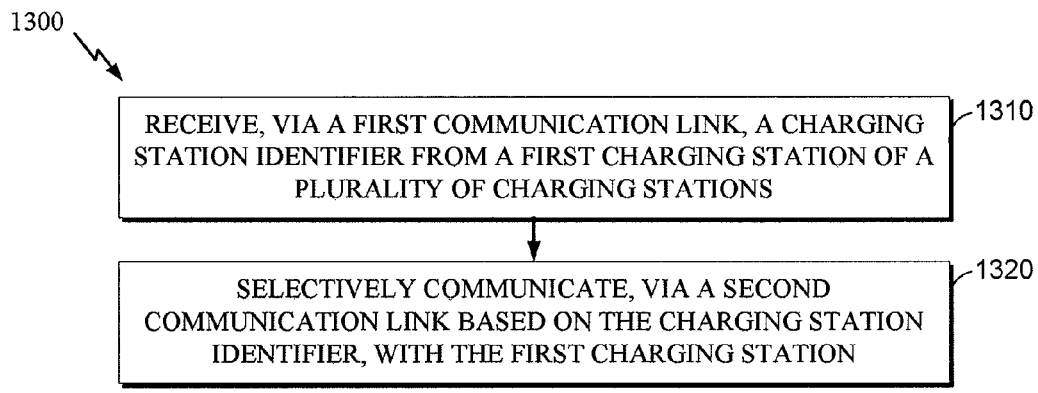
FIG. 13 illustrates a flowchart of another exemplary method of receiving wireless power at an electric vehicle.

FIG. 13 illustrates a flowchart 1300 of another exemplary method of receiving wireless power at an electric vehicle. Although the method of flowchart 1300 is described herein with reference to the multi-vehicle and multi-parking parking and charging system 800, discussed above with respect to FIG. 8, a person having ordinary skill in the art will appreciate that the method of flowchart 1300 may be implemented by another device described herein, or any other suitable device. In an embodiment, the steps in flowchart 1300 may be performed by a processor or controller such as, for example, the BCU 804a-c and/or the VCU 810 (FIG. 8). Although the method of flowchart 1300 is described herein with reference to a particular order, in various embodiments, blocks herein may be performed in a different order, or omitted, and additional blocks may be added.

First, at block 1310, the electric vehicle 808 receives a charging station identifier from a first charging station (such as, for example, the charging station 801a) of a plurality of charging stations. The electric vehicle 808 receives the charging station identifier via a first communication link such as, for example, an RFID link. In an embodiment, as the electric vehicle 808 enters the parking space 806a, an RFID reader (not shown) on the electric vehicle 808 reads the charging station identifier from an RFID tag (not shown) located on or around the base pad 802a. The RFID tag can be a passive tag that can be energized by the RFID reader or by the charging pad 802a.

The charging station identifier can indicate a base station identifier associated with the charging station 801a such as, for example, a WBSS of the base charging communication system 372. The charging station identifier can include the base station identifier as an encoded or un-encoded string. In an embodiment, the VCU 810 can map the charging station identifier to the base station identifier of the charging station 801a.

Then, at block 1320, the electric vehicle 808 selectively communicates with the charging station 801a via a second communication link. The second communication link is based on the received charging station identifier. For example, after the VCU 810 maps the charging station identifier to the base station identifier of the charging station 801a, the electric vehicle communication system 374 can connect to the base charging communication system 372 broadcasting the mapped base station identifier. The second communication link can include any of Dedicated Short-Range Communications (DSRC), IEEE 802.11x (e.g., WiFi), Bluetooth, zigbee, cellular, etc. The second communication link can be used for one or more of: electric vehicle guidance, electric vehicle alignment, charging control, status communication, authorization and/or identification, and payment management.

Figure 14:
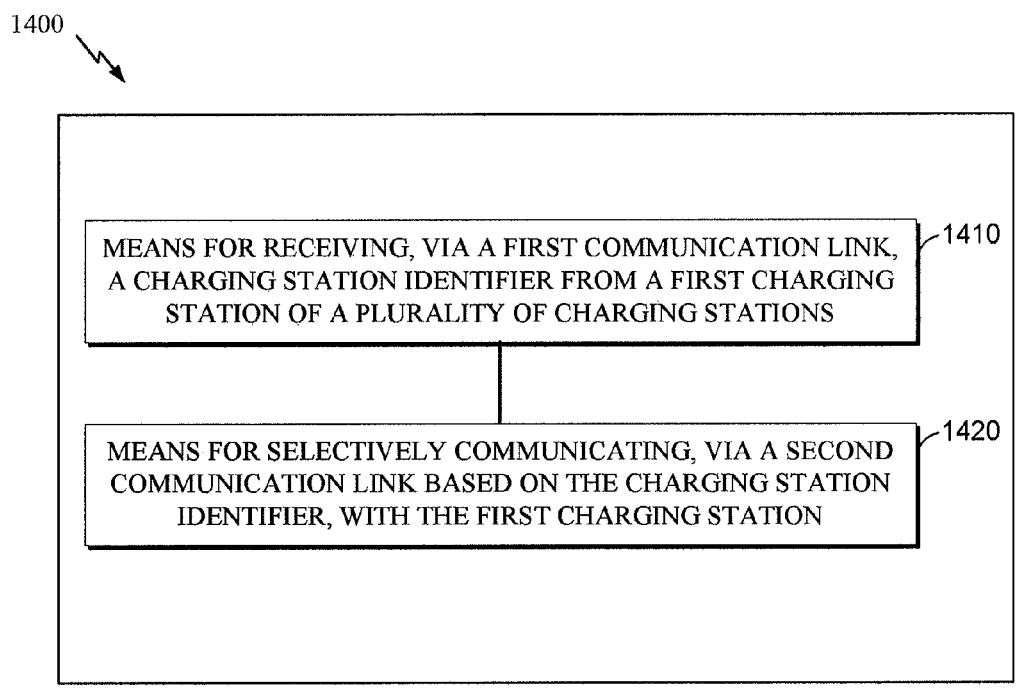
FIG. 14 is a functional block diagram of a wireless power apparatus, in accordance with another exemplary embodiment of the invention.

FIG. 14 is a functional block diagram of a wireless power apparatus 1400, in accordance with another exemplary embodiment of the invention. Those skilled in the art will appreciate that a wireless power apparatus may have more components than the simplified wireless communication device 1400 shown in FIG. 14. The wireless power apparatus 1400 shown includes only those components useful for describing some prominent features of implementations within the scope of the claims. The wireless power apparatus 1400 includes means 1410 for receiving, via a first communication link, a charging station identifier from a first charging station of a plurality of charging stations, and means 1420 for selectively communicating, via a second communication link based on the charging station identifier, with the first charging station.

In an embodiment, the means 1410 for receiving, via a first communication link, a charging station identifier from a first charging station of a plurality of charging stations can be configured to perform one or more of the functions described above with respect to block 1310 (FIG. 13). In various embodiments, the 1410 for receiving, via a first communication link, a charging station identifier from a first charging station of a plurality of charging stations can be implemented by one or more of the RFID reader on the vehicle 808 (FIG. 8), and the VCU 810 (FIG. 8).

In an embodiment, the means 1420 for selectively communicating, via a second communication link based on the charging station identifier, with the first charging station can be configured to perform one or more of the functions described above with respect to block 1320 (FIG. 13). In various embodiments, the means 1420 for selectively communicating, via a second communication link based on the charging station identifier, with the first charging station can be implemented by one or more of the electric vehicle communication system 374 (FIG. 8), and the VCU 810 (FIG. 8).

Figure 15:
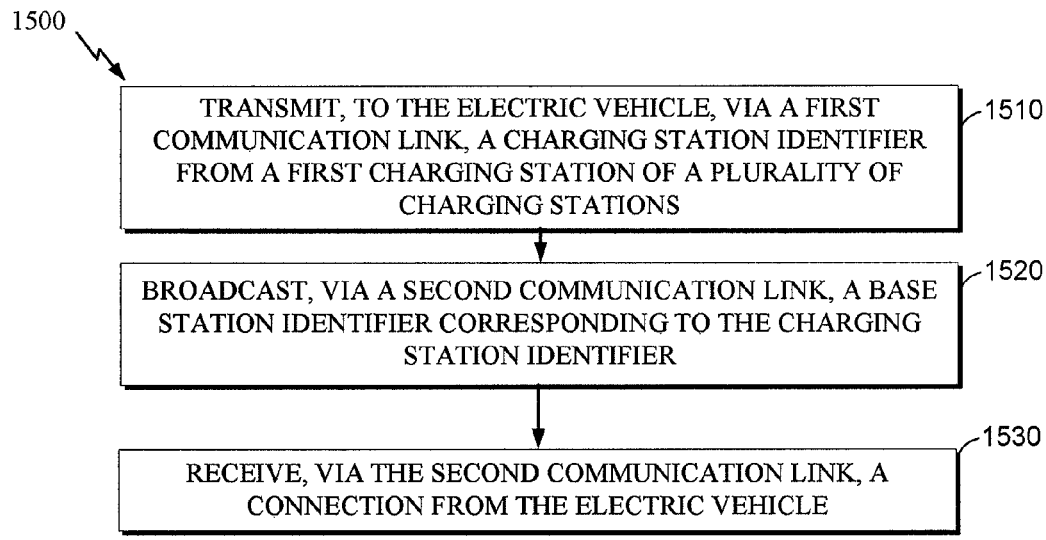
FIG. 15 illustrates a flowchart of another exemplary method of providing wireless power to an electric vehicle.

FIG. 15 illustrates a flowchart 1500 of another exemplary method of providing wireless power to an electric vehicle. Although the method of flowchart 1500 is described herein with reference to the multi-vehicle and multi-parking parking and charging system 800, discussed above with respect to FIG. 8, a person having ordinary skill in the art will appreciate that the method of flowchart 1500 may be implemented by another device described herein, or any other suitable device. In an embodiment, the steps in flowchart 1500 may be performed by a processor or controller such as, for example, the BCU 804a-c and/or the VCU 810 (FIG. 8). Although the method of flowchart 1500 is described herein with reference to a particular order, in various embodiments, blocks herein may be performed in a different order, or omitted, and additional blocks may be added.

First, at block 1510, a first charging station (such as, for example, the charging station 801a) of a plurality of charging stations transmits a charging station identifier to the electric vehicle 808. The charging station 801a transmits the charging station identifier via a first communication link such as, for example, an RFID link. In an embodiment, as the electric vehicle 808 enters the parking space 806a, an RFID reader (not shown) on the electric vehicle 808 reads the charging station identifier from an RFID tag (not shown) located on or near the base pad 802*a*. The RFID tag can be a passive tag that can be energized by the RFID reader or by the charging pad 802*a*.

Next, at block 1520, the charging station 801*a* broadcasts a base station identifier corresponding to the charging station identifier. For example, the charging station identifier can indicate a base station identifier associated with the charging station 801*a* such as, for example, a WBSS of the base charging communication system 372. The charging station identifier can include the base station identifier as an encoded or un-encoded string. In an embodiment, the VCU 810 can map the charging station identifier to the base station identifier of the charging station 801*a*. The base charging communication system 372 can be configured to broadcast the base station identifier in accordance with, for example, any of Dedicated Short-Range Communications (DSRC), IEEE 802.11x (e.g., WiFi), Bluetooth, zigbee, cellular, etc.

Then, at block 1530, the charging station 801*a* receives a connection from the electric vehicle 808 via the second communication link. For example, after the VCU 810-maps the charging station identifier to the base station identifier of the charging station 801*a*, the electric vehicle communication system 374 can connect to the base charging communication system 372 broadcasting the mapped base station identifier. Once the connection is established, the second communication link can be used for one or more of: electric vehicle guidance, electric vehicle alignment, charging control, status communication, authorization and/or identification, and payment management.

Figure 16:
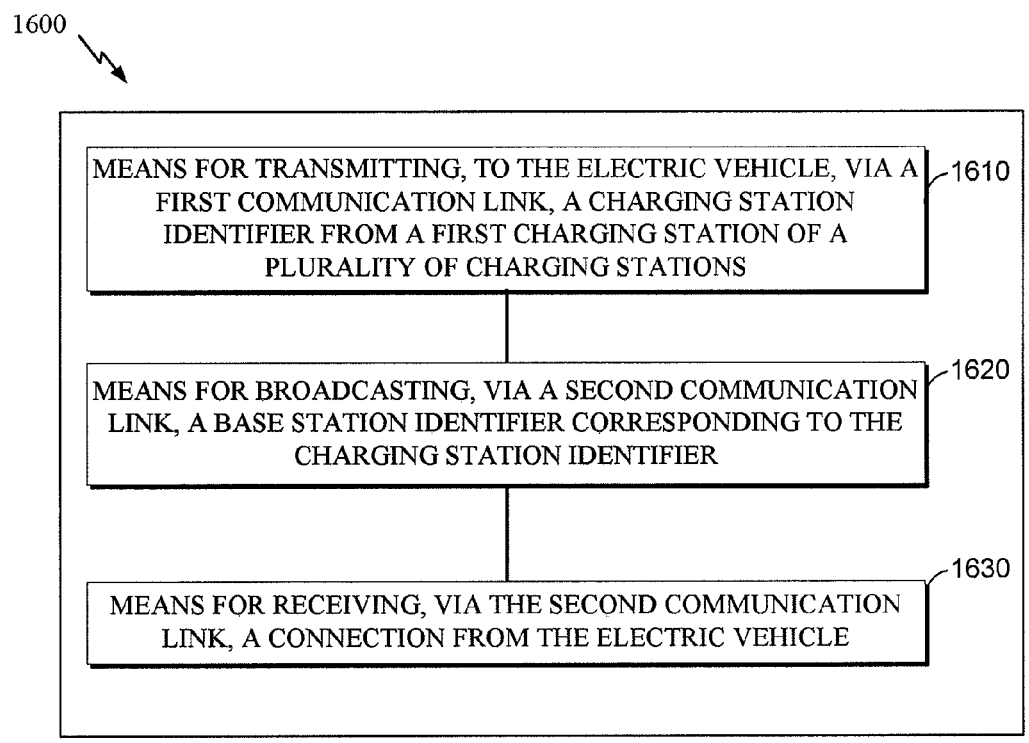
FIG. 16 is a functional block diagram of a wireless power apparatus, in accordance with another exemplary embodiment of the invention.

FIG. 16 is a functional block diagram of a wireless power apparatus 1600, in accordance with another exemplary embodiment of the invention. Those skilled in the art will appreciate that a wireless power apparatus may have more components than the simplified wireless communication device 1600 shown in FIG. 16. The wireless power apparatus 1600 shown includes only those components useful for describing some prominent features of implementations within the scope of the claims. The wireless power apparatus 1600 includes means 1610 for transmitting, to the electric vehicle, via a first communication link, a charging station identifier from a first charging station of a plurality of charging stations, means 1620 for broadcasting, via a second communication link, a base station identifier corresponding to the charging station identifier, and means 1630 for receiving, via the second communication link, a connection from the electric vehicle.

In an embodiment, the means 1610 for transmitting, to the electric vehicle, via a first communication link, a charging station identifier from a first charging station of a plurality of charging stations can be configured to perform one or more of the functions described above with respect to block 1510 (FIG. 15). In various embodiments, the means 1610 for transmitting, to the electric vehicle, via a first communication link, a charging station identifier from a first charging station of a plurality of charging stations can be implemented by one or more of the RFID reader on the electric vehicle 808 (FIG. 8) and the BCU 804*a* (FIG. 8).

In an embodiment, the means 1620 for broadcasting, via a second communication link, a base station identifier corresponding to the charging station identifier can be configured to perform one or more of the functions described above with respect to block 1520 (FIG. 15). In various embodiments, the means 1620 for broadcasting, via a second communication link, a base station identifier corresponding to the charging station identifier can be implemented by one or more of the base charging communication system 372 (FIG. 8), and the BCU 804*a* (FIG. 8).

In an embodiment, the means 1630 for receiving, via the second communication link, a connection from the electric vehicle can be configured to perform one or more of the functions described above with respect to block 1530 (FIG. 15). In various embodiments, the means 1630 for receiving, via the second communication link, a connection from the electric vehicle can be implemented by one or more of the base charging communication system 372 (FIG. 8), and the BCU 804*a* (FIG. 8).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal. Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of charging a vehicle in a facility having a parking and charging system including a plurality of parking spaces and a plurality of charging stations corresponding to the plurality of parking spaces, the method comprising:
   determining distances between the vehicle within the facility and two or more charging stations of the plurality of charging stations, the distances determined using signals communicated directly between the vehicle and each charging station of the two or more charging stations; and
   selectively further communicating, based on the distances, with a first charging station of the two or more charging stations.

2. The method of claim 1, further comprising determining whether the distance between the vehicle and the first charging station is below a threshold value.

3. The method of claim 2, further comprising selectively further communicating with the first charging station if the distance between the vehicle and the first charging station is below the threshold value.

4. The method of claim 1, further comprising:
   detecting an identification of a ranging device included in the first charging station based on the distance between the vehicle and the first charging station; and
   determining an identification of a wireless communication device in the first charging station based on the identification of the ranging device.

5. The method of claim 4, wherein the identification of the ranging device is substantially identical to the identification of the wireless communication device.

6. The method of claim 1, wherein determining the distances between the vehicle and the two or more charging stations comprises:
   transmitting a signal to each charging station of the two or more charging stations;
   receiving a response signal from each charging station of the two or more charging stations; and
   measuring a delay, for each charging station of the two or more charging stations, between said transmitting and said receiving.

7. The method of claim 1, further comprising receiving an alignment signal from the first charging station for aligning the vehicle with the first charging station.

8. The method of claim 1, further comprising receiving a charging signal from the first charging station sufficient to charge the vehicle.

9. The method of claim 1, further comprising charging the vehicle wirelessly using the first charging station.

10. The method of claim 1, wherein the plurality of charging stations are located within a common parking area.

11. The method of claim 1, wherein selectively communicating with the first charging station comprises establishing a first communication link with the first charging station.

12. The method of claim 11, further comprising transmitting a vehicle identifier to the first charging station via a second communication link.

13. The method of claim 12, wherein the second communication link comprises a radio-frequency identification (RFID) link.

14. An apparatus for charging a vehicle in a facility having a parking and charging system including a plurality of parking spaces and a plurality of charging stations corresponding to the plurality of parking spaces, comprising:
   a ranging device configured to communicate signals directly between the vehicle and two or more charging stations of the plurality of charging stations:
   a processor configured to use the signals to determine distances between the vehicle within the facility and the two or more charging stations of the plurality of charging stations; and
   a transceiver configured to selectively communicate, based on the distances, with a first charging station of the two or more charging stations.

15. The apparatus of claim 14, wherein the processor is further configured to determine whether the distance between the vehicle and the first charging station is below a threshold value.

16. The apparatus of claim 15, wherein the transceiver is further configured to selectively communicate with the first charging station if the distance between the vehicle and the first charging station is below the threshold value.

17. The apparatus of claim 14, wherein the processor is further configured to:
   detect an identification of a ranging device included in the first charging station based on the distance between the vehicle and the first charging station; and
   determine an identification of a wireless communication device in the first charging station based on the identification of the ranging device.

18. The apparatus of claim 17, wherein the identification of the ranging device included in the first charging station is substantially identical to the identification of the wireless communication device.

19. The apparatus of claim 14, wherein the processor is configured to determine the distances between the vehicle and each charging station of the two or more charging stations by measuring a delay, for each charging station of the two or more charging stations, between a transmission of a signal transmitted to the charging station and a reception of a response signal from the charging station.

20. The apparatus of claim 14, wherein the transceiver is further configured to receive an alignment signal from the first charging station for aligning the vehicle with the first charging station.

21. The apparatus of claim 14, wherein the transceiver is further configured to receive a charging signal from the first charging station sufficient to charge the vehicle.

22. The apparatus of claim 14, wherein the first charging station is configured to wirelessly charge the vehicle.

23. The apparatus of claim 14, wherein the plurality of charging stations are located within a common parking area.

24. The apparatus of claim 14, wherein the transceiver is further configured to establish a first communication link with the first charging station for selectively communicating with the first charging station.

25. The apparatus of claim 24, wherein the transceiver is further configured to transmit a vehicle identifier to the first charging station via a second communication link.

26. The apparatus of claim 25, wherein the second communication link comprises a radio-frequency identification (RFID) link.

27. An apparatus for charging a vehicle in a facility having a parking and charging system including a plurality of parking spaces and a plurality of charging stations corresponding to the plurality of parking spaces, comprising:
means for communicating signals directly between the vehicle and two or more charging stations of the plurality of charging stations;
means for determining distances, using the signals, between the vehicle within the facility and two or more charging stations of the plurality of charging stations; and
means for selectively communicating, based on the distances, with a first charging station of the two or more charging stations.

28. The apparatus of claim 27, further comprising means for determining whether the distance between the vehicle and the first charging station is below a threshold value, and wherein the means for selectively communicating is further configured to selectively communicate with the first charging station if the distance between the vehicle and the first charging station is below the threshold value.

29. The apparatus of claim 27, further comprising:
means for detecting an identification of a ranging device included in the first charging station based on the distance between the vehicle and the first charging station; and
means for determining an identification of a wireless communication device in the first charging station based on the identification of the ranging device.

30. The apparatus of claim 27, wherein the means for determining the distances between the vehicle and each charging station of the two or more charging stations is configured to determine the distances between the vehicle and each charging station of the two or more charging stations by measuring a delay, for each charging station of the two or more charging stations, between a transmission of a signal transmitted to the charging station and a reception of a response signal from the charging station.

31. The apparatus of claim 27, wherein the first charging station is configured to wirelessly charge the vehicle.

32. The apparatus of claim 27, wherein the selectively communicating means is configured to establish a first communication link with the first charging station for selectively communicating with the first charging station.

33. The apparatus of claim 27, wherein the selectively communicating means is configured to transmit a vehicle identifier to the first charging station via a second communication link.

34. The apparatus of claim 33, wherein the second communication link comprises a radio-frequency identification (RFID) link.

35. A non-transitory computer-readable medium comprising code that, when executed by one or more processors, causes an apparatus to:
communicate signals directly between a vehicle and two or more charging stations of a plurality of charging stations within a facility having a parking and charging system including a plurality of parking spaces and the plurality of charging stations corresponding to the plurality of parking spaces, the vehicle within the facility;
determine distances, using the signals, between the vehicle and the two or more charging stations of the plurality of charging stations; and
selectively communicate, based on the distances, with a first charging station of the two or more charging stations.

36. The computer-readable medium of claim 35, further comprising code that, when executed by the one or more processors, causes the apparatus to determine whether the distance between the vehicle and the first charging station is below a threshold value, and further comprises code that, when executed by the one or more processors, causes the apparatus to selectively communicating with the first charging station if the distance between the vehicle and the first charging station is below the threshold value.

* * * * *